United States Patent
Ikeda

(10) Patent No.: US 7,035,363 B1
(45) Date of Patent: Apr. 25, 2006

(54) INFORMATION SIGNAL RECEPTION AND TRANSMISSION APPARATUS AND METHOD

(75) Inventor: Nozomu Ikeda, Tokyo (JP)

(73) Assignee: Sony Corporation, (JP)

( * ) Notice: Subject to any disclaimer, the term of this patent is extended or adjusted under 35 U.S.C. 154(b) by 974 days.

(21) Appl. No.: 09/644,911

(22) Filed: Aug. 24, 2000

(30) Foreign Application Priority Data

Aug. 25, 1999 (JP) ................. P11-238366

(51) Int. Cl.
H04L 7/00 (2006.01)
H04L 12/40 (2006.01)

(52) U.S. Cl. ................ 375/356; 375/355; 375/358; 370/346

(58) Field of Classification Search ........... 375/219, 375/256, 258, 259, 295, 316, 130, 133, 346, 375/355, 358; 725/2, 120, 100, 110, 131, 725/151; 370/346
See application file for complete search history.

(56) References Cited

U.S. PATENT DOCUMENTS

| | | | | |
|---|---|---|---|---|
| 4,622,583 A * | 11/1986 | Watanabe et al. | ............ | 725/14 |
| 5,621,659 A * | 4/1997 | Matsumoto et al. | ......... | 710/10 |
| 5,675,574 A * | 10/1997 | Norizuki et al. | ........... | 370/230 |
| 5,802,017 A * | 9/1998 | Sato et al. | ..................... | 369/2 |
| 6,237,049 B1 * | 5/2001 | Ludtke | .......................... | 710/8 |
| 6,389,137 B1 * | 5/2002 | Sugita et al. | ................. | 380/34 |
| 6,631,100 B1 * | 10/2003 | Utsumi | ..................... | 369/30.27 |
| 6,650,824 B1 * | 11/2003 | Horlander et al. | ........... | 386/46 |
| 6,681,015 B1 * | 1/2004 | Hioki et al. | ................ | 380/231 |
| 2002/0032907 A1 * | 3/2002 | Daniels | ...................... | 725/51 |
| 2005/0144641 A1 * | 6/2005 | Lewis | ......................... | 725/60 |

* cited by examiner

Primary Examiner—Jay K. Patel
Assistant Examiner—Qutub Ghulamali
(74) Attorney, Agent, or Firm—Lerner, David, Littenberg, Krumholz & Mentlik, LLP

(57) ABSTRACT

A method and a system for reliably supplying information about an electronic device employed as a primary information signal receiver device to an electronic device employed as a primary information signal sender device via an existing analog transmission line or digital serial transmission line. A set top box (STB) employed as the primary information signal sender device and a VTR (video tape recorder) employed as the primary information signal receiver are connected to each other via an analog transmission line. A device information transmitter of the VTR supplies an electric signal representing device information indicating the device type and the operation status of the primary information signal receiver device over the analog transmission line via which the STB and the VTR are connected to each other thereby transmitting the device information associated with the VTR in a reverse direction to the STB via a path including an analog input terminal of the VTR, the analog transmission line, and an analog output terminal of the STB.

23 Claims, 15 Drawing Sheets

FROM THE CONTROLLER

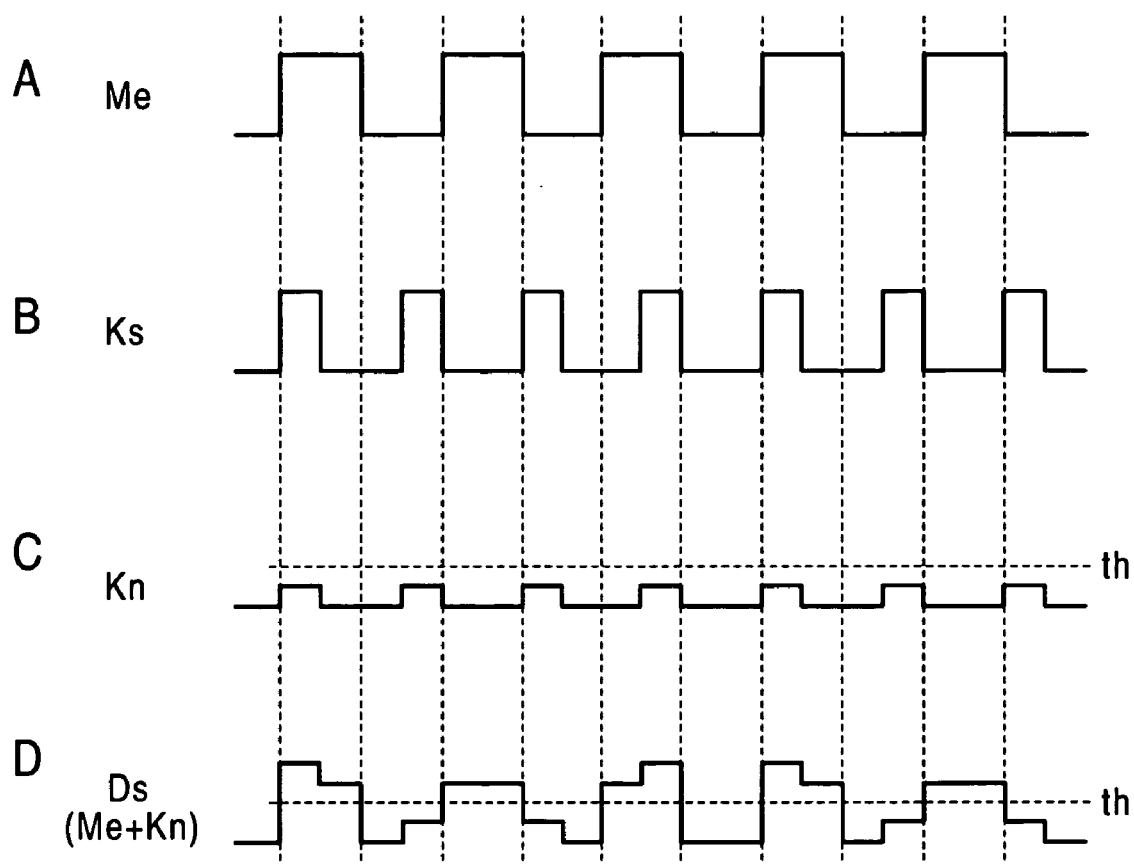

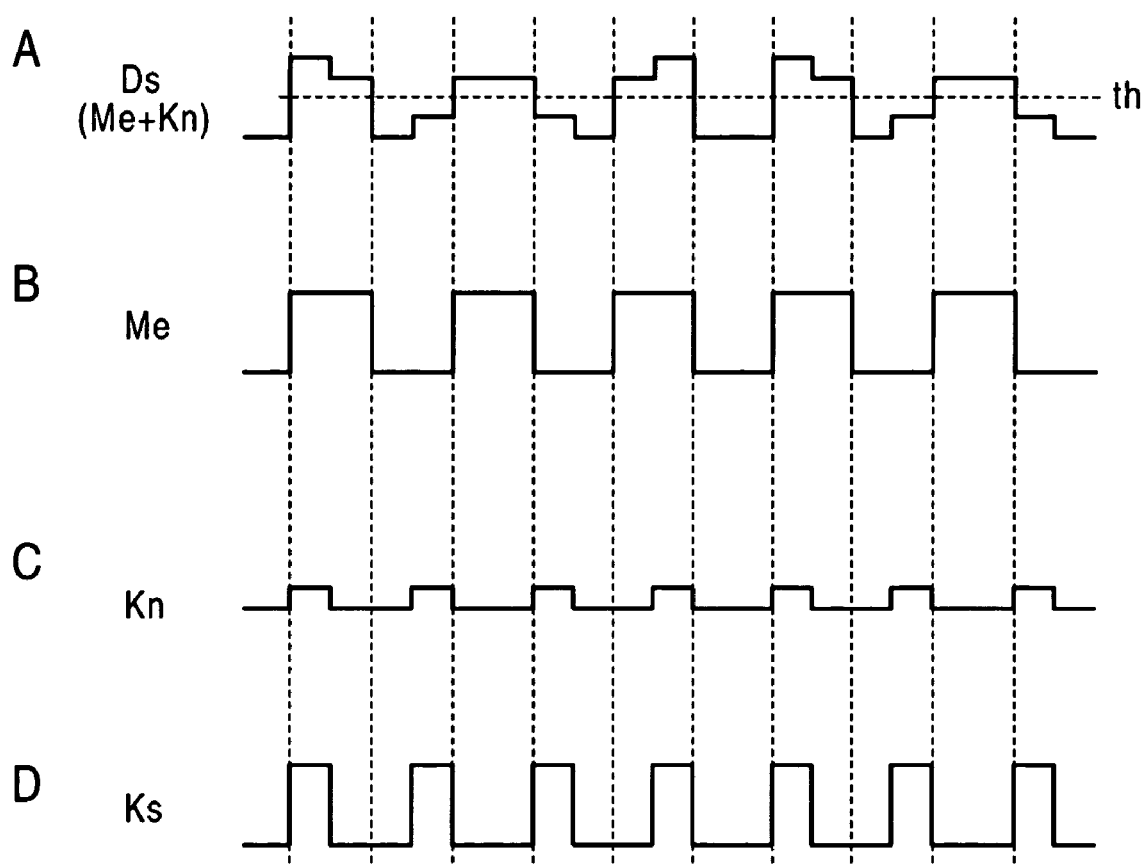

INFORMATION SIGNAL RECEPTION AND TRANSMISSION APPARATUS AND METHOD

BACKGROUND OF THE INVENTION

1. Field of the Invention

The present invention relates to a method and apparatus for transmitting information about an electronic device employed as a primary information signal receiver device to an electronic device employed as a primary information signal sender device in a system in which a primary information signal such as a video signal or an audio signal is transmitted to the sender device to the receiver device. More particularly, the present invention relates to an information signal transmission method, an information signal transmission system, an information signal transmitting apparatus used in the system, an information signal receiving apparatus used in the system, and methods for information signal transmitting apparatus or receiving apparatus to transmit or receive an information signal, which allow device information to be transmitted.

2. Description of the Related Art

Various digital contents are provided via broadcast media such as digital broadcasting, communication media such as the Internet, or a recording medium such as a CD (compact disc), an MD (mini disc), or a DVD (digital video disc). However, a great problem is that digital contents are often copied illegally by unauthorized users. Thus, there is a need for a reliable technique of protecting copyright of digital contents.

To prevent the above problem, it is known in the art to supply a digital content together with information for managing its copying (copy management information) attached thereto such that a copying operation performed by a recording apparatus or the like is controlled in accordance with the copy management information attached to the digital content thereby preventing the digital content from being copied illegally.

However, even when copy management information is attached to a digital content, it is impossible to correctly control the copying operation in accordance with the copy management information unless a recording device or the like has the capability of performing a copying operation in accordance with the copy management information (that is, unless the recording device used is compliant). In other words, even if copy management information is attached to a digital content, it is possible to illegally copy it using a device (noncompliant device) which does not have the capability of controlling the copying operation in accordance with copying management information.

One known technique for protecting copyright of a digital content in a more reliable fashion is to use an IEEE1394 digital interface. When two electronic devices are connected to each other via an IEEE1394 digital interface, if an electronic device employed as a digital content receiver device is a compliant device, device information associated with the receiver device is transmitted to an electronic device employed as a digital content sender device.

For example, when a device which receives a digital broadcasting signal and outputs the received signal is employed as the digital content sender device and a compliant recording device is employed as the digital content receiver device, information indicating that the receiver device is a recording device is transmitted from the receiver device to the sender device via the digital interface.

The digital content sender device outputs a digital content to the digital content receiver device after encrypting the digital content. Furthermore, on the basis of information returned from the receiver device via the digital interface, the sender device determines whether the receiver device is compliant. The sender device also checks copy management information attached to the digital content and determines whether a key used to decrypt the digital content should be sent to the receiver device, depending upon the copy management information and also depending upon whether the receiver device is compliant.

More specifically, when the receiver device is a compliant device, the key required for decryption is sent to the receiver device. However, the key required for decryption is not sent if the receiver device is noncompliant thereby effectively preventing the digital content from being illegally copied. Such a communication control technique is called an IEEE1394 secure bus.

In some cases, a digital content is converted to an analog signal, and the resultant analog signal is supplied to a conventional VTR (video tape recorder) or cassette tape recorder and recorded on a video tape or a cassette tape. However, conventional analog electronic devices such as a VTR and a cassette tape recorder have an analog input terminal which accepts only an analog video signal or an analog audio signal.

Therefore, when an electronic device such as a digital broadcast receiver or a digital content reproduction device converts a digital content into an analog signal and outputs the resultant analog signal together with copy management information, it is impossible to protect copyright of the content because the primary information signal sender device cannot know whether an analog electronic device employed as the primary information signal receiver device is a compliant device having the capability of performing a copying operation in accordance with the copy management information, unlike the system using the above-described digital interface which ensures protection of copyright.

One possible method for avoiding the above problem in a system using an analog interface is to transmit device information associated with an electronic device employed as a primary analog signal receiver device from the primary analog signal receiver device to an electronic device employed as a primary analog signal sender device, in a similar manner as with the IEEE1394 digital interface described above, thereby making it possible for the primary analog signal sender device to control outputting of a primary analog signal taking into account also the device information associated with the primary analog receiver device.

However, in order to send the device information associated with the primary analog signal receiver device to the primary analog signal receiver device, it is required to provide an additional transmission line via which the device information is transmitted. More specifically, it is required that the primary analog signal receiver device should have an additional output terminal for outputting the device information and the primary analog signal sender device should have an additional input terminal for inputting the device information, and it is required that these input and output terminals are connected to each other via a cable. An alternative method for sending the device information is to use wireless transmission.

The additional cable transmission line or wireless transmission line for transmitting the device information results in an increase in the production cost of the electronic device used as the primary analog signal sender or receiver device. Furthermore, even in a system designed to use an additional transmission line to transmit device information, it is impossible to protect copyright of a content if a user does not correctly connect the additional transmission line to sender and receiver devices. That is, there is a possibility that the additional transmission line becomes useless.

In view of the above, it is an object to solve the above problems. More specifically, it is an object of the present invention to provide an information signal transmission method, an information signal transmission system, an information signal sending apparatus, an information signal sending method, an information signal receiving apparatus, and an information signal receiving method, which allow information about a primary information signal receiving device to be reliably supplied to a primary information signal sending device via an existing analog transmission line or digital serial transmission line.

SUMMARY OF THE INVENTION

According to an aspect of the present invention, there is provided an information signal transmission method of transmitting a primary information signal from a first electronic device to a second electronic device via a transmission line connected between an analog output terminal of the first electronic device and an analog input terminal of the second electronic device, the method being characterized in that: the second electronic device supplies, in the form of an electronic signal, device information associated with the second electronic device over the information signal transmission line; and the first electronic device detects the device information supplied in the form of the electronic signal over the transmission line and controls outputting of the primary information signal in accordance with the detected device information.

According to another aspect of the present invention, there is provided an information signal transmission system for transmitting a primary information signal from a first electronic device to a second electronic device via a transmission line connected between an analog output terminal of the first electronic device and an analog input terminal of the second electronic device, the system being characterized in that: the second electronic device includes device information transmitting means for supplying, in the form of an electronic signal, device information associated with the second electronic device over the information signal transmission line; and the first electronic device includes device information detecting means for detecting the device information supplied in the form of the electronic signal over the transmission line; and control means for controlling the output of the primary information signal in accordance with the device information detected by the device information detecting means.

According to still another aspect of the present invention, there is provided a method for a first electronic device to transmit a primary information signal to a second electronic device via a transmission line connecting an analog output terminal of the first electronic device to an analog output terminal of the second electronic device, the method comprising the steps of: detecting device information associated with the second electronic device, the device information being supplied from the second electronic device via the transmission line for transmitting the information signal; and controlling the output of the primary information signal in accordance with the detected device information.

According to still another aspect of the present invention, there is provided an information signal receiving apparatus for receiving a primary information signal, the information signal receiving apparatus serving as a second electronic device whose analog input terminal is connected to an analog output terminal of a first electronic device via a transmission line so that the primary information signal is transmitted from the first electronic device to the second electronic device, the information signal receiving apparatus comprising device information transmitting means for supplying, in the form of an electronic signal, device information associated with the second electronic device over the information signal transmission line.

According to still another aspect of the present invention, there is provided a method for a second electronic device to receive a primary information signal from a first electronic device via a transmission line connecting an analog output terminal of the first electronic device to an analog output terminal of the second electronic device, the method comprising the step of: transmitting device information associated with the second electronic device, in the form of an electric signal, over the transmission line for transmitting the information signal.

BRIEF DESCRIPTION OF THE DRAWINGS

FIG. 16 is a schematic representation of waveforms of various signals appearing when information such as device information is transmitted in a reverse direction via a digital serial transmission line; and FIG. 17 is a schematic representation of waveforms of various signals appearing when information such as device information transmitted in a reverse direction via a digital serial transmission line is detected.

DESCRIPTION OF THE PREFERRED EMBODIMENTS

Preferred embodiments of an information signal transmission method, an information signal transmission system, an information signal sending apparatus, an information signal sending method, an information signal receiving apparatus, and an information signal receiving method, according to the present invention are described below with reference to the accompanying drawings. In the embodiments described below, by way of example, a set top box for receiving a digital television signal and a VTR (video tape recorder) are connected to each other via an analog interface.

That is, in the embodiments described below, the set top box is employed as a first electronic device, that is, a primary information signal sending device which receives a broadcasting signal, demodulates it and transmits the resultant signal to a second electronic device. On the other hand, the VTR is employed as the second electronic device, that is, a primary information signal receiver device which receives and processes a primary information signal, that is, a video signal and an audio signal from the set top box serving as the first electronic device.

Although both the set top box and the VTR have a digital interface, the digital interface is not described below. Furthermore, although the set top box is capable of outputting not only a video signal but also an audio signal of a digital television program, a part for processing an audio signal is not described below for the sake of simplicity.

Herein, a video signal of a digital television program is assumed to include copy management information based on the CGMS (copy generation management system) or an electronic watermark technique to manage generations of copies of the video signal.

The copy management information for managing generations of copies may specify one of three copying status: "permission to freely make a copy", "permission to make a first-generation copy", and "prohibition against making a copy", as with copy management information according to the CGMS. Alternatively, the copy management information may specify one of four copying status: "permission to freely make a copy", "permission to make a first-generation copy", "prohibition against making a further copy", and "prohibition against making a copy", as with copy management information based on the electronic watermark technique.

First Embodiment

Figure 1:
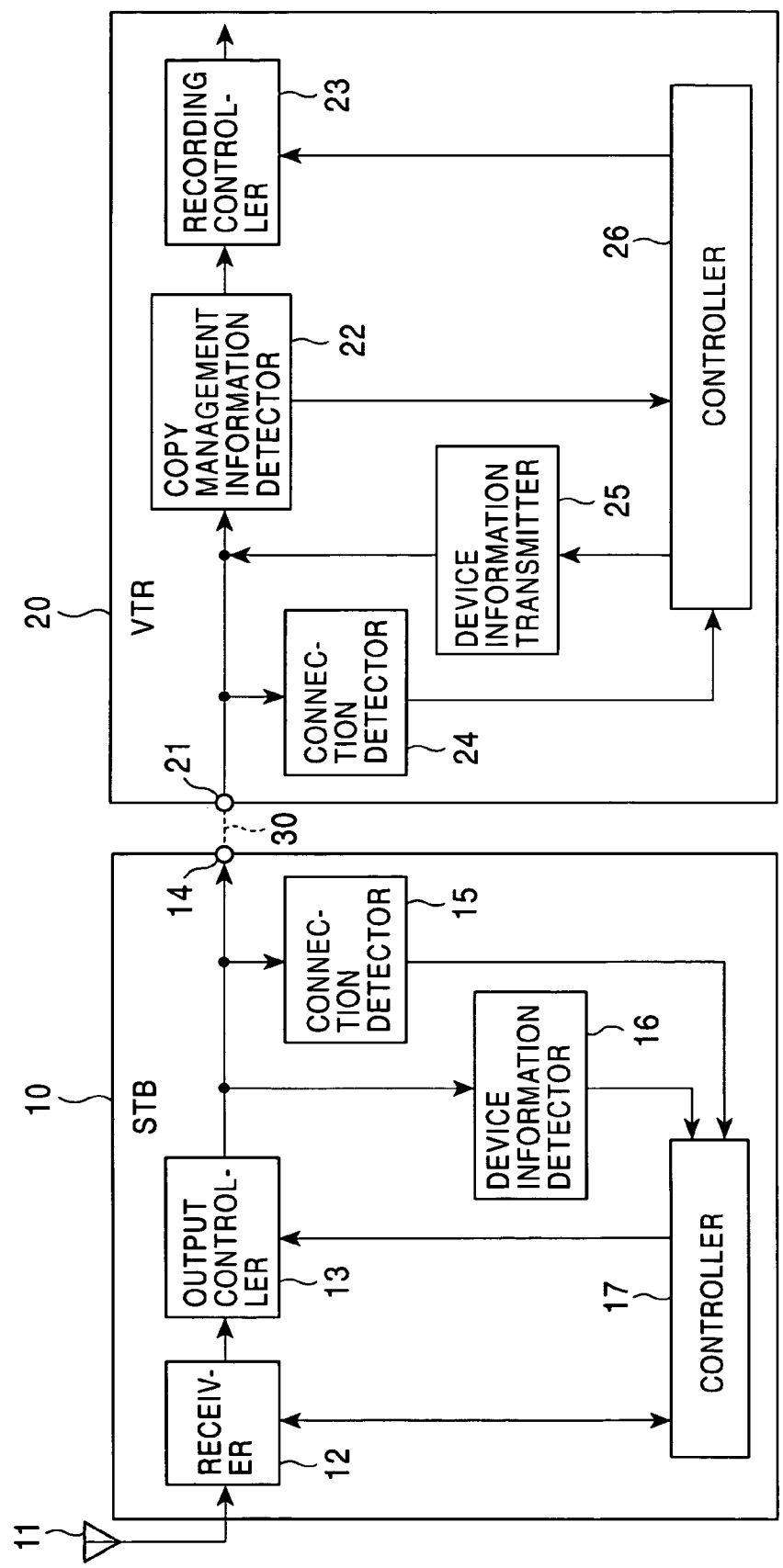
FIG. 1 is a block diagram illustrating an embodiment of an information transmission system according to the present invention.

FIG. 1 is a block diagram illustrating a first embodiment of an information signal transmission system including a set top box (hereinafter referred to as an STB) 10 and a VTR (video tape recorder) 20. The STB 10 includes an antenna 11, a receiving unit 12, an output controller 13, an analog output terminal 14, a connection detector, 15, a device information detector 16, and a controller 17.

The VTR 20 includes an analog input terminal 21, a copy management information detector 22, a recording controller 23, a connection detector, a device information transmitter 25, and a controller 26. In FIG. 1, reference numeral 30 denotes an analog transmission line. The analog output terminal 14 of the STB 10 and the analog input terminal 21 of the VTR 20 are connected to each other via the analog transmission line 30 so that a primary information signal is transmitted from the STB 10 to the VTR 20. In this first embodiment, an analog video signal of a television broadcast program is transmitted as the primary information signal.

Set Top Box

If a broadcast signal of a digital television program is received by the antenna 11, the received signal is transferred to the receiving unit 12. Although not shown, the receiving unit 11 according to the first embodiment may include a tuner, a descrambler, a copy management information extractor, and a digital-to-analog converter.

In accordance with a channel selection command issued by a user of the STB 10, the controller 17 sends a channel control signal to the receiving unit 12. In response, the receiving unit 12 selects a channel specified by the channel control signal and receives a broadcast signal of the selected channel. The receiving unit 12 demodulates the received broadcast signal and descrambles (decrypts) it. The resultant signal is then converted into analog form and supplied to the output controller 13. Furthermore, the receiving unit extracts copy management information from the video signal of the received television program and supplies the extracted copy management information to the controller 17, thereby allowing the controller 17 to know the content of the copy management information attached to the video signal to be output.

In this first embodiment, under the control of the controller 17, the output controller 13 controls outputting the analog video signal received from the receiving unit 12, outputting the analog video signal is enabled or disabled by the output controller 13. The output controller 13 may modify the video signal. For example, the output controller 13 may add display information to the analog video signal. The analog video signal output from the output controller 13 is supplied to the analog output terminal 14 and further to the VTR 20 via the analog transmission line 30.

In the STB 10, as shown in FIG. 1, the connection detector 15 and the device information detector 16 are disposed between the output controller 13 and the analog output terminal 14. The connection detector 15 detects whether an electronic device is brought into connection with the analog output terminal 14, on the basis of the output impedance of the voltage level of the signal.

In the present embodiment, the device information detector 16 detects device information transmitted from an electronic device connected to the STB 10 to the STB 10 via the analog transmission line 30. In this first embodiment, the device information is used to inform the STB 10 as to whether the electronic device connected to the STB 10 is a recording device such as a VTR or a reproducing device such as a TV monitor.

In this first embodiment, if the device information detector 16 detects device information, the STB 10 determines that the electronic device connected to the STB 10 is a compliant device having the capability of transmitting device information. If no device information is received within a predetermined period of time, that is, if the device information detector 16 detects no device information within the predetermined period of time after the connection detector 15 detected that the electronic device was connected to the STB 10, the controller 17 determines that the device connected to the STB 10 is a noncompliant device which does not have the capability of transmitting device information.

As described above, depending upon whether device information has been received via the analog transmission line 30, the STB 10 determines whether the device connected to the analog output terminal 14 is a device compliant with the specifications of the information signal transmission system according to the first embodiment and thus having the capability of transmitting device information (referred to as a system-compliant device or more simply as a compliant device) or a device noncompliant with the specifications of the information signal transmission system according to the first embodiment and thus incapable of transmitting device information (referred to as a non-system-compliant device or more simply as a noncompliant device).

If the connection detector 15 detects that an electronic device has been connected to the analog output terminal 14, the connection detector 15 informs the controller 17 of the connection. Upon reception of the notification that the electronic device has been connected, the controller 17 checks the detection output from the device information detector 16 to determine whether device information has been received from the connected electronic device via the analog transmission line 30.

If device information transmitted from the electronic device connected to the analog output terminal 14 is received, the controller 17 of the STB 10 controls the output controller 13 taking into account the content of the device information, copy management information attached to the information signal to be output, and other factors. Under the control of the controller 17, the output controller 13 outputs the analog video signal.

In the case where no device information is received, the controller 17 determines that the electronic device connected to the STB 10 is a noncompliant device. In this case, the controller 17 controls the output controller 13 such that the received video signal of the primary TV channel is not output unless copy management information indicates that copying is permitted.

In the case where device information has been received which indicates that the connected device is a recording device, the controller 17 determines that the electronic device connected to the STB 10 is a compliant recording device and controls the output controller 13 such that the received video signal of the primary TV channel is output unless copy management information indicates that copying is prohibited.

In the present embodiment, as described above, a primary information signal sender device can control the outputting of a primary information signal taking into account also the type of an electronic device employed as a primary information signal receiver device, thereby ensuring copyright protection of a received television program of a selected channel.

VTR

In this first embodiment, the VTR 20 serves as a receiving device which receives an analog video signal from the STB10. In the VTR 20, the connection detector 24 disposed between the analog input terminal 21 and the copy management information detector 22 detects whether a device is brought into connection with the analog input terminal 21, on the basis of the input impedance of the voltage level of an input signal.

If the connection detector 24 detects that an electronic device has been connected to the analog input terminal 21, the connection detector 24 informs the controller 26 that an electronic device has been connected. Upon reception of the notification that an electronic device has been connected to the analog input terminal 21, the controller 26 controls the device information transmitter 24 to generate an electronic signal representing that the receiving device is a recording device and supply it over the analog transmission line disposed between the analog input terminal 21 and the copy management information detector 22.

As a result, the device information output from the device information transmitter 25 of the VTR 20 is transmitted in a reverse direction to the STB 10 through a path including the analog input terminal 21 of the VTR 20, the analog transmission line 30, and the analog output terminal of the STB 10. That is, the device information is transmitted from the VTR 20 to the STB 10 using the analog transmission line 30 which is normally used to transmit an analog video signal in one direction from the STB 10 to the VTR 20.

In this specific embodiment, because the VTR 20 is a compliant device capable of transmitting device information to the STB 10, the STB 10 outputs a video signal via the analog output terminal 14 if the copy management information attached to the video signal indicates that copying is not prohibited.

The video signal output from the analog output terminal 14 of the STB 10 is supplied to the analog input terminal 21 of the VTR 20 and input into the VTR 20.

The analog video signal input to the VTR 20 is supplied to the copy management information detector 22. The copy management information detector 22 detects copy management information attached to the analog video signal and transmits the detected copy management information to the controller 26. The controller 26 controls the recording operation taking into account various conditions including the copy management information detected by the copy management information detector 22.

More specifically, in the case where the detected copy management information indicates that copying is permitted only for a first generation, the controller 26 rewrites the copy management information so as to indicate that further copying is prohibited or copying is unconditionally prohibited, and the controller 26 outputs the video signal together with the rewritten copy management information so that they are recorded on a video tape. In the present embodiment, as described above, the recording controller also has the capability of rewriting copy management information.

When the content of the copy management information is different from that described above, the VTR 20 of the present embodiment can correctly operate depending upon the content thereof. For example, the recording controller 23 outputs an analog video signal so as to record it on a video tape only when copy management information attached to the received video signal indicates that copying is permitted. On the other hand, when copy management information attached to an analog video signal indicates that copying is prohibited, the recording controller 23 does not output the received analog video signal thereby preventing illegal copying.

As can be understood from the above description, the VTR 20 according to the present embodiment is capable of receiving a video signal from only the STB 10 but also other electronic devices and capable of controlling the copying operation in accordance with copy management information attached to the video signal.

Operations of STB 10 and VTR 20

Operations of the STB 10 and the VTR 20 connected to each other via the analog transmission line 30 in the information transmission system according to the first embodiment are described in further detail below.

Figure 2:
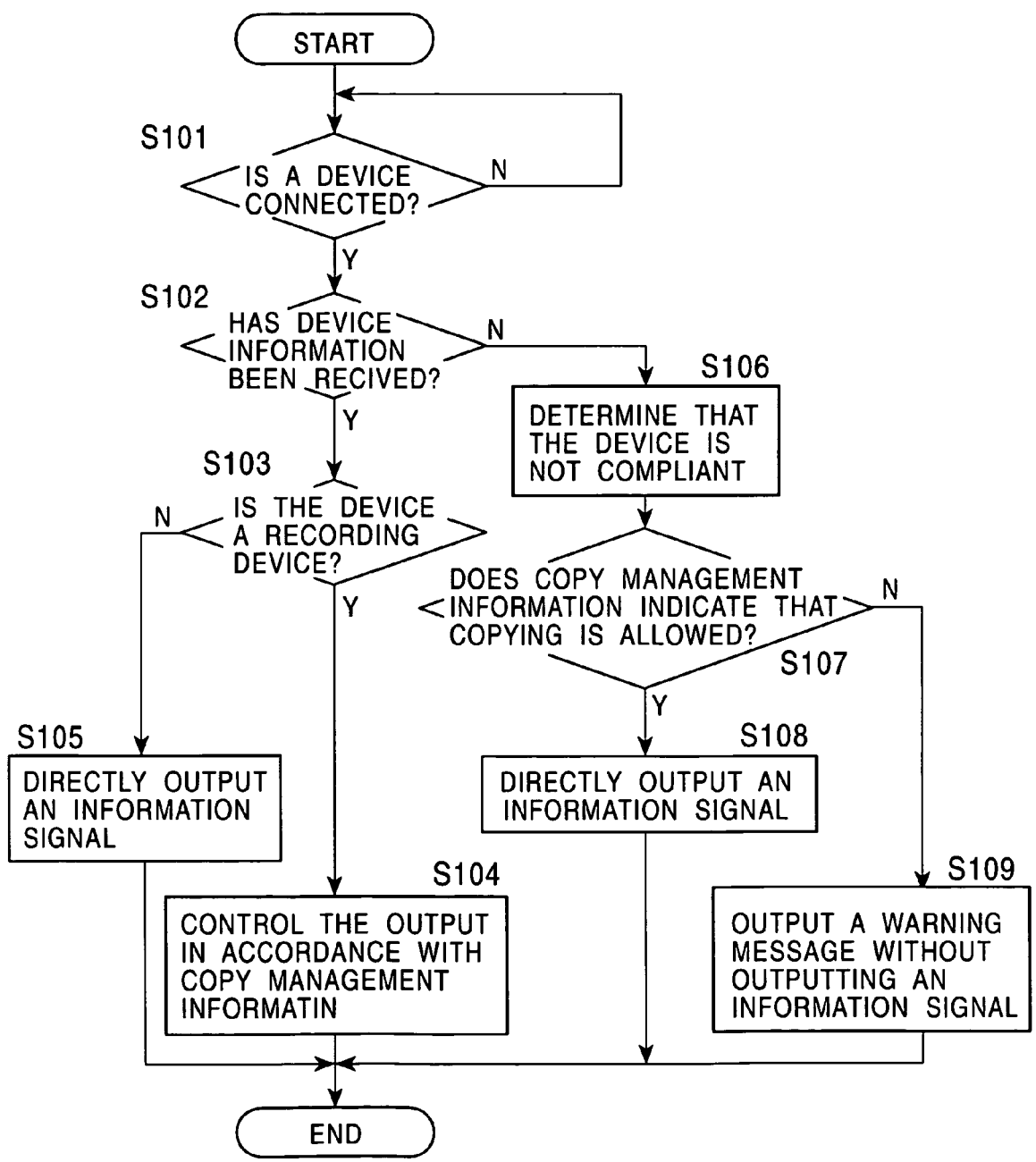
FIG. 2 is a flow chart illustrating a process performed by an STB 10 shown in FIG. 1.

The operation of the STB 10 is described first, with reference to FIG. 2. FIG. 2 illustrates a process which is performed by the controller 17 when the power of the STB 10 is turned on. First, the controller 17 determines whether an electronic device to which a video signal is to be output is connected to the output terminal 14, on the basis of the detection result output from the connection detector 15 (step S101).

If it is determined in step S101 that an electronic device is connected to the output terminal 14, the controller 17 determines whether device information transmitted from the connected electronic device has been detected (received), on the basis of the detection result output from the device information detector 16 (step S102).

If it is determined in step S102 that device information has been detected by the device information detector 16, the controller 17 further determines whether the electronic device connected to the analog output terminal 14 of the STB 10 is a recording device, on the basis of the device information detected by the device information detector 16 (step S103).

If it is determined in step S103 that the electronic device connected to the output terminal 14 of the STB 10 is a recording device, the controller 17 of the STB 10 controls the output controller 13 such that outputting of a video signal of a television program of a selected channel is controlled in accordance with copy management information such as CGMS information detected from the video signal received by the receiving unit 12 (step S104).

More specifically, in step S104, if copying management information detected from a video signal of a television program of a selected channel indicates that copying is prohibited, the controller 17 controls the output controller 13 such that the video signal is not output from the STB 10. On the other hand, if copying management information indicates that copying is unconditionally permitted or permitted only for a first generation, the controller 17 controls the output controller 13 such that the video signal is output from the STB 10. Thus, the STB 10 outputs via the analog output terminal only video signals having attached copy management information indicating that copying is unconditionally permitted or permitted only for a first generation.

On the other hand, in the case where it is determined in step S103 that the electronic device connected to the analog output terminal of the STB 10 is not a recording device but a reproducing device such as a television monitor, the controller 17 controls the output controller 13 such that a received video signal of a television program is directly output (step S105).

In the case where it is determined in step S102 that no device information is detected, the controller 17 determines that the electronic device connected to the output terminal 14 of the STB 10 is a noncompliant device incapable of transmitting device information (step S106). In this case, the controller 17 further determines whether copy management information attached to the video signal indicates that copying is (unconditionally) permitted (step S107).

If it is determined in step S107 that the copying management information indicates that copying is (unconditionally) permitted, the controller 17 controls the output device 13 such that the video signal is directly output (step S108).

On the other hand, in the case where it is determined instep S107 that copying management information indicates copying is not (unconditionally) permitted, the controller 17 controls the output controller 13 such that the video signal is not output and such that a message warning that the video signal is not output because copying thereof is prohibited or limited is displayed on a monitor device connected to the STB 10 or on an LCD (liquid crystal display) of the STB 10 (step S109).

Alternatively, in step S109, the warning message may also be output via the analog output terminal 14 so that the warning message is displayed on the electronic device connected to the STB 10 thereby presenting the warning message to a user.

If one of steps S104, S105, S108, or S109 is performed, the process shown in FIG. 2 is completed.

In this first embodiment, as described above, when the STB 10 detects that an electronic device to which a video signal is to be output has been connected to the STB 10, the STB 10 determines whether device information has been transmitted via the analog transmission line 30 from the electronic device (VTR 20) to which a video signal is to be output. If device information has been detected, it is determined that the connected electronic device is a compliant device capable of transmitting device information. In this case, the STB 10 controls the outputting of a received video signal of a television program taking into account the content of the detected device information.

Figure 3:
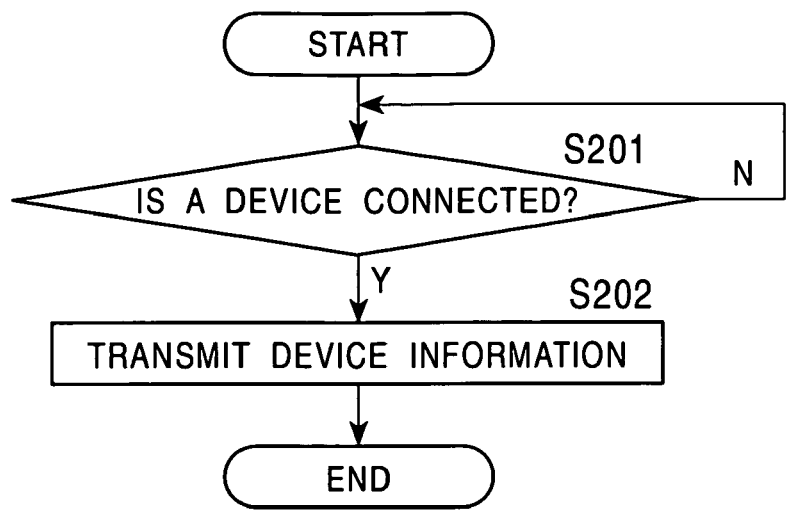
FIG. 3 is a flow chart illustrating a process performed by a VTR 20 shown in FIG. 1.

Now, the operation of the VTR 20 is described. FIG. 3 is a flow chart illustrating the operation of the VTR 20 according to the first embodiment. When the power of the VTR 20 is turned on, the controller 26 monitors the output signal of the connection detector 24 and waits until an electronic device has been connected to the VTR 20 (step S201).

If it is detected in step S201 that an electronic device has been connected to the analog input terminal 21, the controller 26 of the VTR 20 controls the device information transmitter 25 such that device information is output to the analog transmission line 30 so as to transmit it to the STB 10 employed as a sender device for supplying a video signal (S202). Thus, the process shown in FIG. 3 is completed.

In this first embodiment, as described above, when it is detected that an electronic device has been connected to the analog input terminal 21 of the VTR 20, the VTR 20 outputs device information over the analog transmission line 30 to transmit the device information to the connected electronic device thereby ensuring that the connected electronic device (STB 10) can receive the device information before the STB 10 transmits a primary information signal (video signal). Note that the transmission of the device information via the analog transmission line does not cause degradation in the video signal transmitted via the analog transmission line, because the transmission of the device information is performed before the transmission of the video signal.

As described earlier, the device information is transmitted from the VTR 20 via the analog transmission line 30 in a direction opposite to the normal direction in which an analog video signal is transmitted from the STB 10 to The VTR 20. Therefore, device information can be transmitted without having to provide an additional signal line between the STB 10 and the VTR 20, that is, between electronic devices for transmitting and receiving a desired primary information signal.

Furthermore, because the analog transmission line 30 for transmitting a desired primary information signal such as a video signal is also used to transmit device information, it is ensured that device information is transmitted in a highly reliable fashion from the VTR 20 employed as a video signal receiver device to the STB 10 employed as a video signal sender device.

As described earlier, after device information is transmitted from the VTR 20, the STB 10 determines whether the device information has been detected. If device information is detected, outputting of a received video signal of a television program of a selected channel is controlled in accordance with the detected device information and copy management information attached to the video signal.

Because the outputting of a video signal is controlled depending upon whether device information has been detected and in accordance with, if device information has been detected, the content of the device information, it is possible to protect copyright of the video signal in a more reliable fashion.

In this first embodiment, when VTR 20 detects that an electronic device has been connected to the analog input terminal 21, the VTR transmits device information associated with the VTR 20 to the connected electronic device. The transmission of device information may be performed repeatedly a predetermined number of times so as to ensure that the STB 10 can detect the device information.

Figure 4:
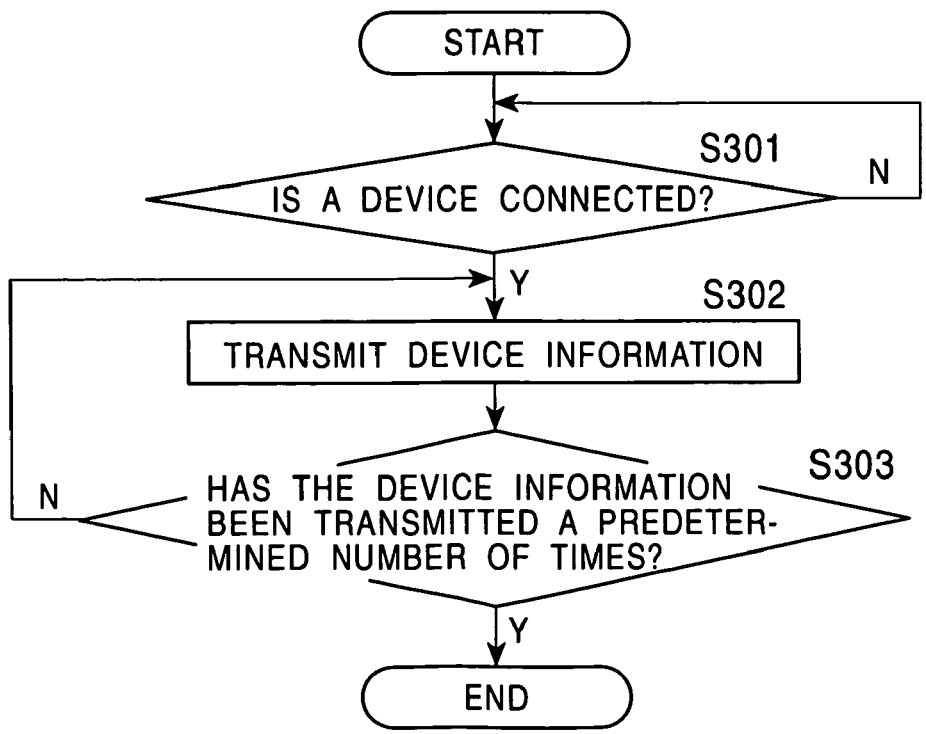
FIG. 4 is a flow chart illustrating another example of a process performed by the VTR 20 shown in FIG. 1.

FIG. 4 is a flow chart illustrating a process performed by the VTR 20 to transmit device information a predetermined number of times. As in the process described above with reference to FIG. 3, if the connection detector 24 of the VTR 20 detects a connection of an electronic device, the controller 26 controls the device information transmitter 25 such that device information is transmitted over the analog transmission line 30 (step S302).

The controller 26 then determines whether device information has been transmitted the predetermined number of times (step S303). More specifically, the controller 26 counts the number of times that the device information transmitter 25 has transmitted device information and stores data representing the counted number of times. The controller 26 checks the value of the data representing the counted number of times to determine whether device information has been transmitted the predetermined number of times.

If it is determined in step S303 that device information has not been transmitted the predetermined number of times, the controller 26 repeats the process from step S302. On the other hand, if it is determined in step S303 that device information has been transmitted the predetermined number of times, the process shown in FIG. 4 is completed.

Thus, when an electronic device is connected to the analog input terminal 21 of the VTR 20, the VTR transmits device information the predetermined number of times so that the STB 10 connected to the VTR 20 receives device information transmitted from the VTR 20 the predetermined number of times thereby ensuring that the STB 20 detects the device information transmitted from the VTR 20.

Modifications of First Embodiment

In the first embodiment described above, both the STB 10 and the VTR 20 have the capability of detecting electrical connection of a device. Therefore, if both the STB 10 and the VTR 20 are connected to the analog transmission line 30 and if power thereof is turned on, the STB 10 and the VTR 20 detect a device has been connected at substantially the same time.

When the STB 10 and the VTR 20 have detected connecting of devices, the VTR 20 transmits device information, and the STB 10 detects the device information transmitted via the analog transmission line 30. Thus, because transmission and reception of device information are performed only at the time when connecting of a device is detected, device information does not cause degradation in a primary information signal such as a video signal transmitted via the analog transmission line 30.

If device information can be supplied over the analog transmission line after converting it to a signal having a level low enough not to interfere with the video signal, device information may be always transmitted or intermittently at predetermined intervals of time even when a video signal is being transmitted from the STB 10 to the VTR 20. This allows the STB 10 to detect device information transmitted from the VTR, whenever detection of device information is required.

In view of the above, in a modification of the first embodiment, a spread spectrum conversion is performed upon device information to convert it to a signal having a low enough level to be regarded as noise which is negligible compared with a video signal. The device information converted into the low-level signal is supplied always or intermittently at predetermined intervals over the analog transmission line 30 so as to transmit it to the STB 10.

When device information is transmitted after converting it into a low-level signal by means of a spread spectrum conversion, the basically the same configurations as those shown in FIG. 1 can be used for the STB 10 and the VTR 20, although detailed structures of the device information transmitter 25 of the VTR 20 and the device information detector 16 of the STB 10 should be modified as described below.

Figure 5:
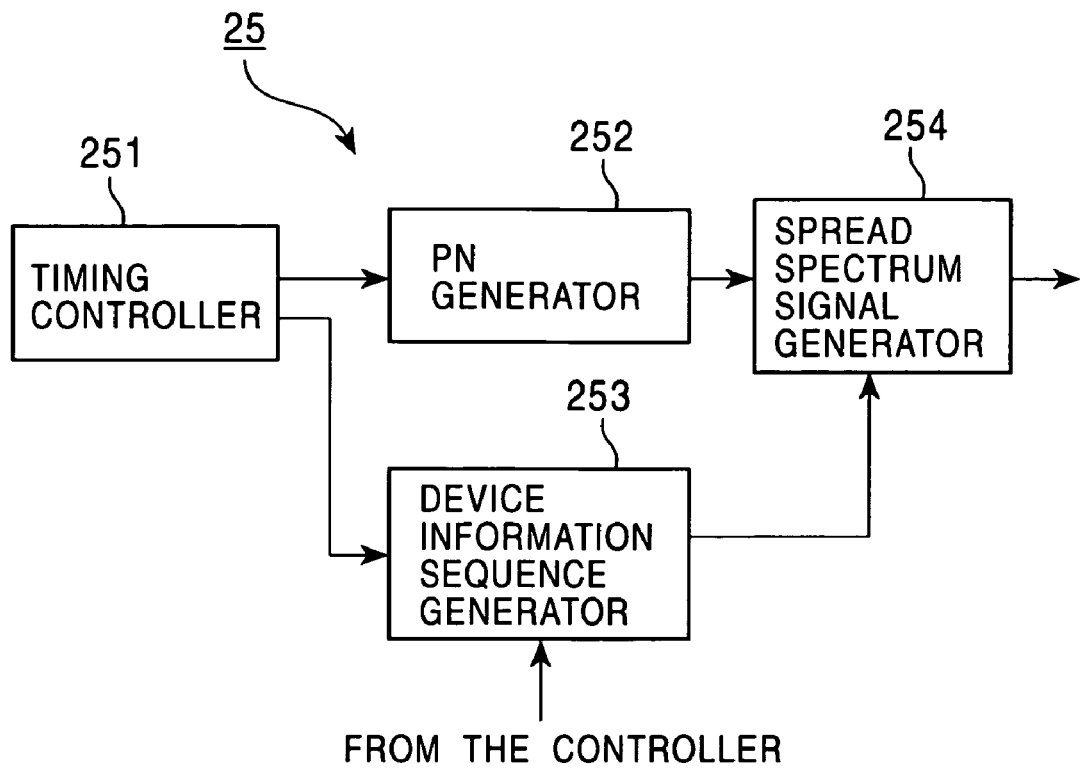
FIG. 5 is a block diagram illustrating another example of a device information transmitter 24 of the VTR 20 shown in FIG. 1.

FIG. 5 is a block diagram illustrating the device information transmitter 25 according to the present modification of the first embodiment. In this modified embodiment, device information is converted to a spread spectrum signal using pseudorandom noise (PN) codes.

As shown in FIG. 5, the device information transmitter 25 includes a timing controller 251, a PN generator 252, a device information sequence generator 253, and a spectrum spreading unit 254.

In this modified embodiment, the timing controller 251 receives a reference clock signal and generates various timing signals including a PN code sequence generation timing signal, a PN code resetting timing signal, a device information sequence generation timing signal, and a device information bit switching timing signal, on the basis of the reference clock signal.

The PN code sequence generation timing signal defines the timing of generating one chip of a PN code sequence having a predetermined code pattern. The PN code resetting timing signal defines the generation timing of the beginning of a PN code sequence having the predetermined code pattern.

The device information sequence generation timing signal defines the timing of generating one chip of a device information sequence to be spectrum-spread using the PN code sequence. The device information bit switching timing signal defines the timing of switching bits of multi-bit device information to be output as the device information sequence.

The PN code sequence generation timing signal and the PN code sequence resetting timing signal generated by the timing controller 251 are supplied o the PN generator 252. On the other hand, the device information sequence generation timing signal and the device information bit switching timing signal are supplied to the device information sequence generator 253.

In response to the timing signal received from the timing controller 251, the PN generator 252 generates a PN code sequence having a predetermined code pattern from its beginning and supplies the generated PN code sequence to the spectrum spreading unit 254. On the other hand, in response to the timing signal received from the timing controller 251, the device information sequence generator 253 generates a device information sequence from the device information supplied by the controller 26 and supplies the resultant device information sequence to the spectrum spreading unit 254.

The spectrum spreading unit 254 spreads the spectrum of the device information sequence using the PN code sequence thereby converting the device information into a spread spectrum signal with a low level. The resultant spread spectrum signal is supplied over the analog transmission line 30 so as to transmit it to STB 10.

Figure 6:
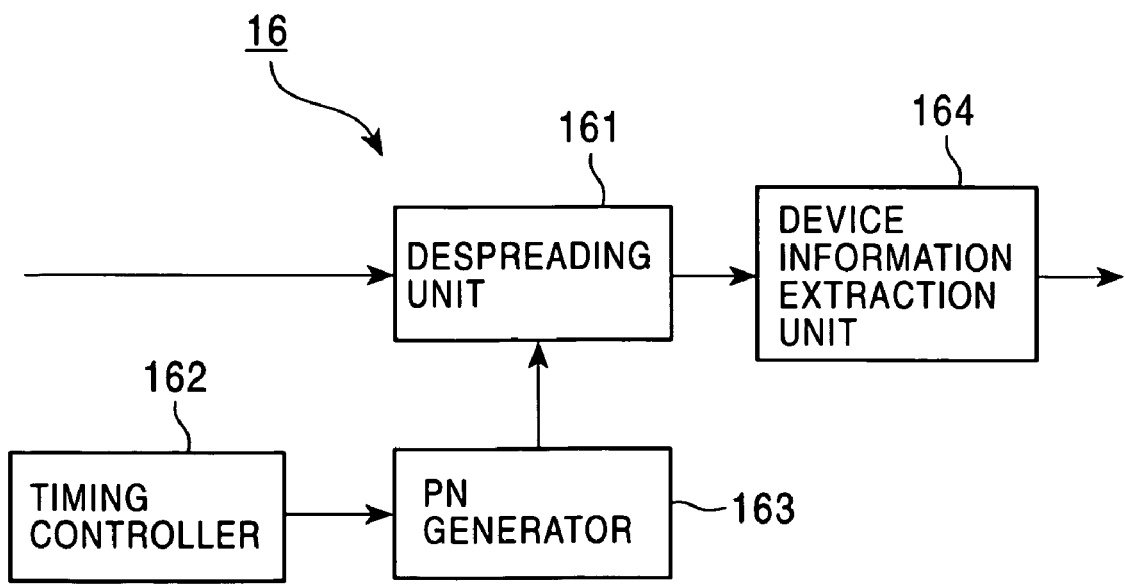
FIG. 6 is a block diagram illustrating another example of a device information detector 16 of the STB 10 shown in FIG. 1.

FIG. 6 is a block diagram illustrating the device information detector 16 according to the modified embodiment. As shown in FIG. 6, the device information detector 16 of the STB 10 includes a despreading unit 161, a timing controller 162, a PN generator 163, and a device information extraction unit 164.

The electronic signal received via the analog transmission line 30 is supplied to the despreading unit 161 of the device information detector 16 of the STB 10. A PN code sequence generated by the PN code generator 163 is also supplied to the despreading unit 161. Herein, the PN generator 163 is formed into a structure similar to that of the above-described PN generator 252 of the VTR 20 such that the PN generator 162 generates the PN code sequence having the same code pattern as that used by the device information transmitter 25 of the VTR 20.

That is, as with the timing controller 251 of the VTR 20, the timing controller 162 of the device information detector 16 of the STB 10 generates a PN code sequence generation timing signal and a PN code sequence resetting timing signal. These two timing signals provide the same timing as that provided in the device information transmitter 25 of the VTR 20.

In response to the timing signal supplied by the timing controller 162, the PN generator 163 generates a PN code sequence having the same code pattern as that of the PN code sequence used to spread the spectrum of device information.

Using the PN code sequence generated by the PN generator 163, the despreading unit 161 despreads the spectrum of the electric signal received via the analog transmission line 30 and supplies the resultant signal to the device information extraction unit 164. The device information extraction unit 164 integrates the despread signal supplied by the despreading unit 161 thereby detecting the original content of the device information. The detected content of the device information is supplied to the controller 17 of the STB 10.

In order to correctly detect the original content of the device information, it is required that the despreading unit 161 should multiplies the spread spectrum signal associated with the device information superimposed upon the electric signal received via the analog transmission line 30 by the same PN code with the same timing as the PN code and the timing employed to spread the spectrum of the device information.

Therefore, when the spectrum despreading is not performed correctly owing to, for example, too low a level of the signal supplied from the despreading unit 161 to the device information extraction unit 164, the timing controller 162 is informed of the incorrect despreading. In response, the timing controller 162 adjusts the timing signals related to the generation timing of the PN code sequence so that despreading is performed correctly.

In this modified embodiment, as described above, device information is converted to a spared spectrum signal having a low level by means of spectrum spreading, and the resultant spread spectrum signal with the low level is supplied over the analog transmission line 30. This makes it possible to supply device information to the STB 10 via the analog transmission line 30 always or repeatedly at predetermined intervals of time without causing interference with a video signal transmitted via the analog transmission line 30.

Figure 7:
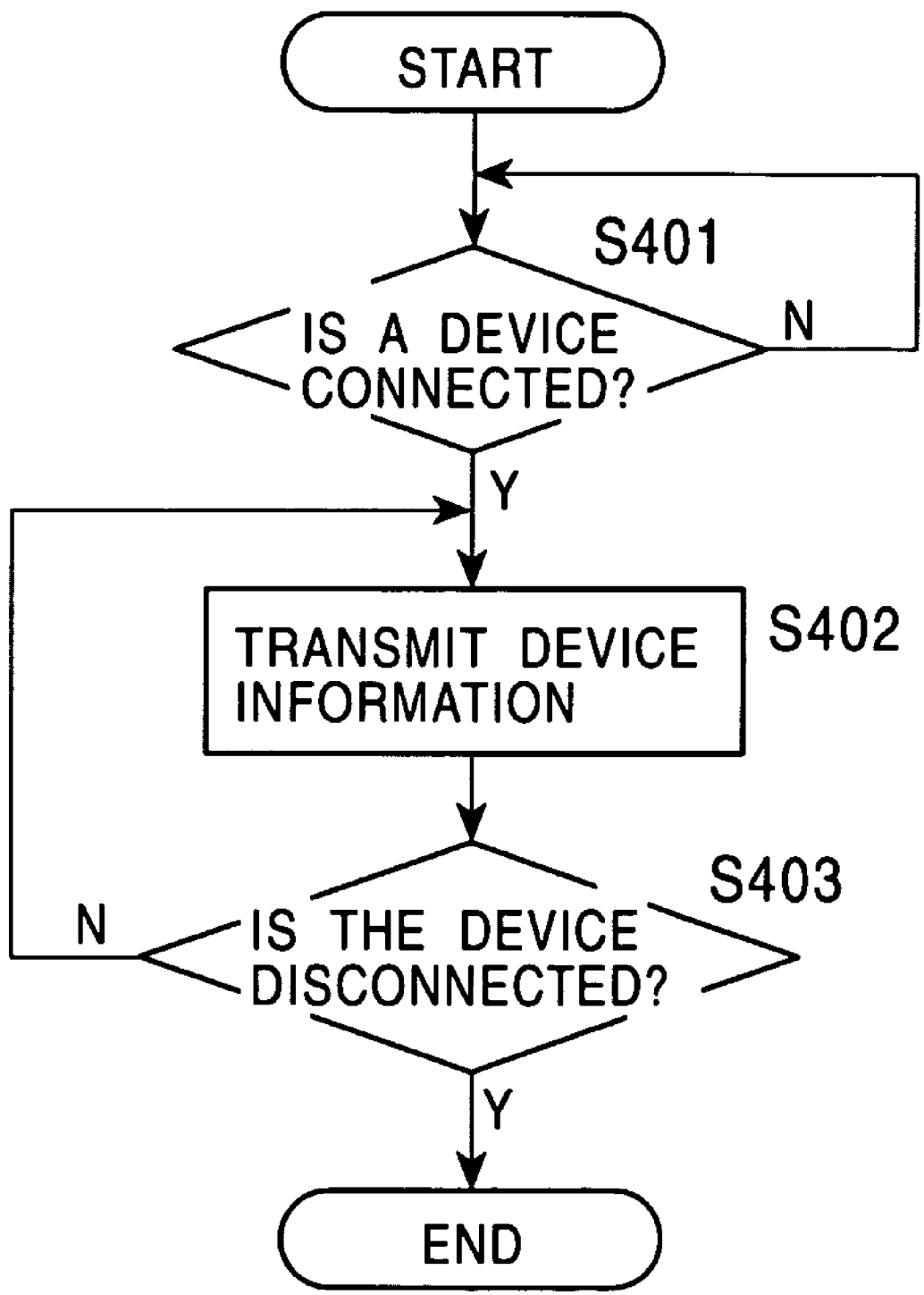
FIG. 7 is a flow chart illustrating another example of a process performed by the VTR 20 shown in FIG. 1.

FIG. 7 is a flow chart illustrating the process performed by the VTR 20 to always transmit device information in the form of a low-level signal to the STB 10 as long as the VTR 20 and the STB 10 are connected to each other. As in the process described earlier with reference to FIG. 3, the controller 26 of the VTR 20 determines whether a device is brought into connection with the analog input terminal of the VTR 20, on the basis of the detection output of the connection detector 24 (step S401).

If it is determined in step S401 that connecting of a device has been detected by the connection detector 24, the controller 26 controls the device information transmitter 25 so as to convert the device information into a spread spectrum signal with a low level and transmit it over the analog transmission line (step S402).

If the electronic device connected to the analog input terminal 21 is removed from the analog input terminal 21 or the power of the electronic device is turned off, the disconnection of the electronic device is detected by the connection detector 24. Thus, the controller 26 determines whether disconnecting of the electronic device has been detected by the connection detector 24 (step S403).

If it is determined in step S403 that disconnecting of the device is not detected by the connection detector 24, the controller 26 repeats the process from step S402. On the other hand, if it is determined in step S403 that disconnecting of the device is detected, the controller 26 terminates the process shown in FIG. 7.

As described above, the conversion of device information into a low-level signal allows the device information to be always transmitted from the VTR 20 to the STB 10 as long as the VTR 20 and the STB 10 are connected to each other. Herein, because the device information is converted to a low-level signal, transmission of the device information via the analog transmission line does not cause degradation in a video signal.

This allows the STB 10 to detect device information supplied from the VTR 20 via the analog transmission line 30 and use it, whenever the STB 10 needs the device information.

Figure 8:
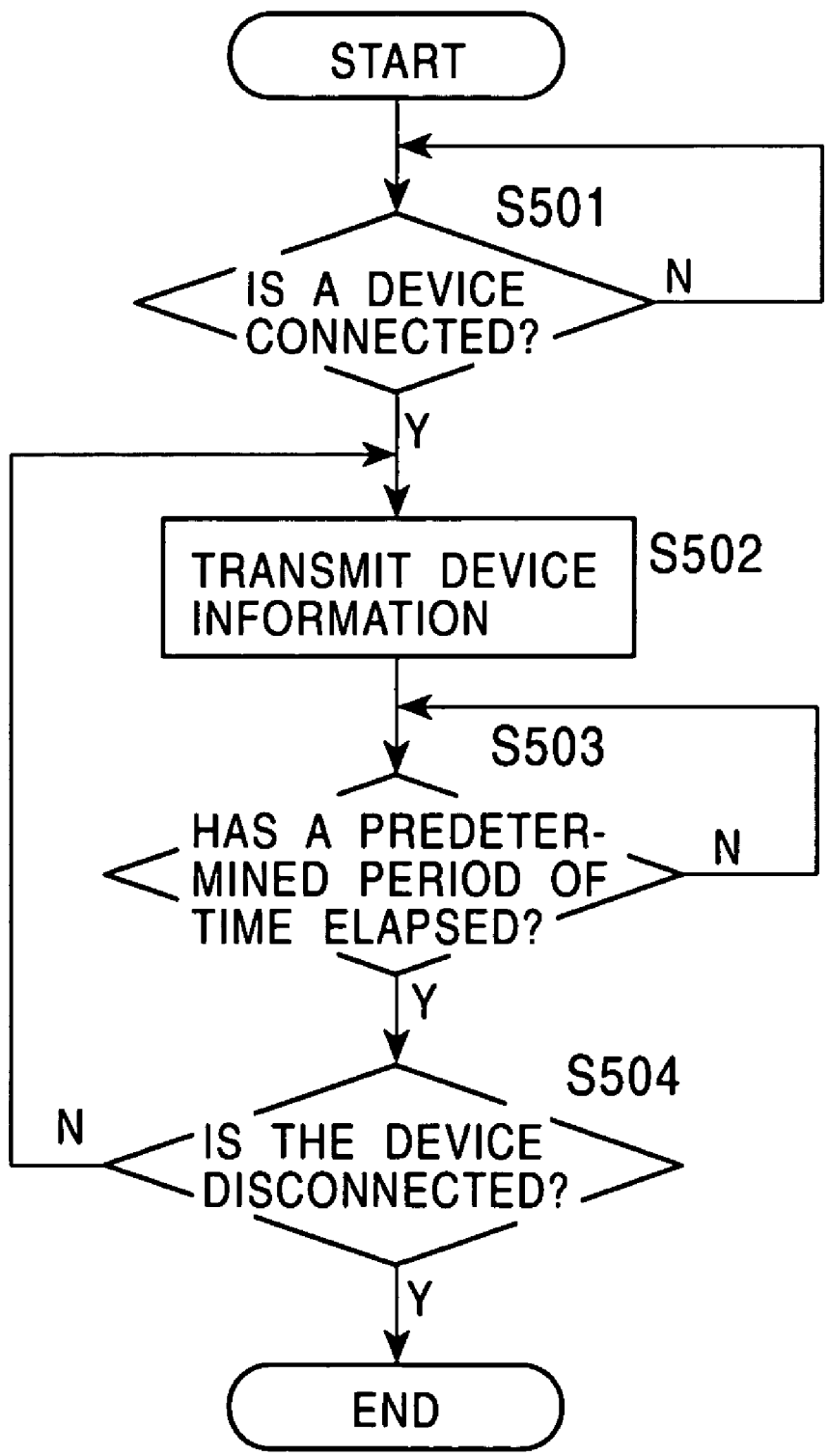
FIG. 8 is a flow chart illustrating still another example of a process performed by the VTR 20 shown in FIG. 1.

Instead of always transmitting low-level device information, it may also be transmitted intermittently at predetermined intervals of time. FIG. 8 is a flow chart illustrating a process performed by the VTR 20 to transmit device information in the form of a low-level signal to the STB 10 intermittently at predetermined intervals of time as long as the VTR 20 and the STB 10 are connected to each other.

In FIG. 8, steps S501 and S502 are similar to steps S401 and 402, respectively, shown in FIG. 7. After transmitting device information in the form of a low-level spread spectrum signal in step S502, the process waits for a predetermined period of time (step S503).

If it is determined in step S503 that the predetermined period of time has elapsed, the controller 26 determines, as in step S403 shown in FIG. 7, whether disconnecting of the device has been detected by the connection detector 24 (step 504).

If it is determined in step S504 that disconnecting of the device is not detected by the connection detector 24, the controller 26 repeats the process from step S502. On the other hand, if it is determined in step S504 that disconnecting of the device is detected, the controller 26 terminates the process shown in FIG. 8.

Thus, device information converted into a low-level spread spectrum signal is repeatedly transmitted at predetermined intervals of time. Also in this case, the conversion of the device information into a low-level signal prevents degradation in a video signal transmitted via the analog transmission line 30. Besides, intermittent transmission results in a further reduction in influence of device information upon the video signal. This technique also allows the STB 10 to detect and use device information which is repeatedly transmitted, when the STB 10 needs the device information.

In the case where device information is transmitted always or intermittently at predetermined intervals of time, the device information may be transmitted regardless of whether a device is connected to the VTR 20. Furthermore, when a device is connected to the VTR 20, device information may be transmitted regardless of whether a primary information signal is being transmitted from the device connected to the VTR 20, because the signal level of the device information is low enough not to affect the primary information signal.

Therefore, when device information in the form of a low-level signal is transmitted always or repeatedly at predetermined intervals of time, at least the VTR employed as a primary information signal receiver device does not need the connection detector.

Second Embodiment

In the first embodiment described above, device information is transmitted and detected when connecting of a device to the VTR 20 or the STB 10 is detected, or device information in the form of a low-level signal is transmitted always or intermittently at intervals of time as long as a device is connected.

As described above in the first embodiment, device information is used by a device, which outputs a primary information signal such as a video signal, to control the outputting of the information signal. Therefore, when a primary information signal sender device needs device information, it may issue a request for transmission of device information, and a primary information signal receiver device may transmit device information in response to the request.

For example, in the case where an STB and a VTR are connected to each other via an analog transmission line as in the first embodiment, the VTR outputs device information over the analog transmission line only when the VTR receives a device information transmission request from the STB. This technique allows a reduction in a load imposed upon the VTR when the VTR transmit device information compared with the case where the VTR transmits device information always or intermittently at predetermined intervals of time.

Furthermore, the load imposed upon the STB when device information is detected is also reduced, because the STB has to detect device information only when device information is transmitted by the VTR in response to a transmission request issued by the STB. This technique also allows the STB to detect in device information in a more reliable fashion. Furthermore, because device information is transmitted in response to a transmission request issued by the STB, the influence of the device information upon the information signal such as a video signal transmitted via the analog transmission line is further reduced.

Thus, in a second embodiment of an information signal transmission system in which a sender device which outputs an information signal and a receiver device which receives the information signal are connected to each other via an analog transmission line, the receiver device transmits device information in response to a request issued by the sender device. Also in this second embodiment, by way of example, the sender device which outputs a primary information signal is an STB (set top box) and the receiver device which receives the information signal is a VTR (video tape recorder). Furthermore, the information signal transmitted from the STB to the VTR is assumed to be a video signal.

Figure 9:
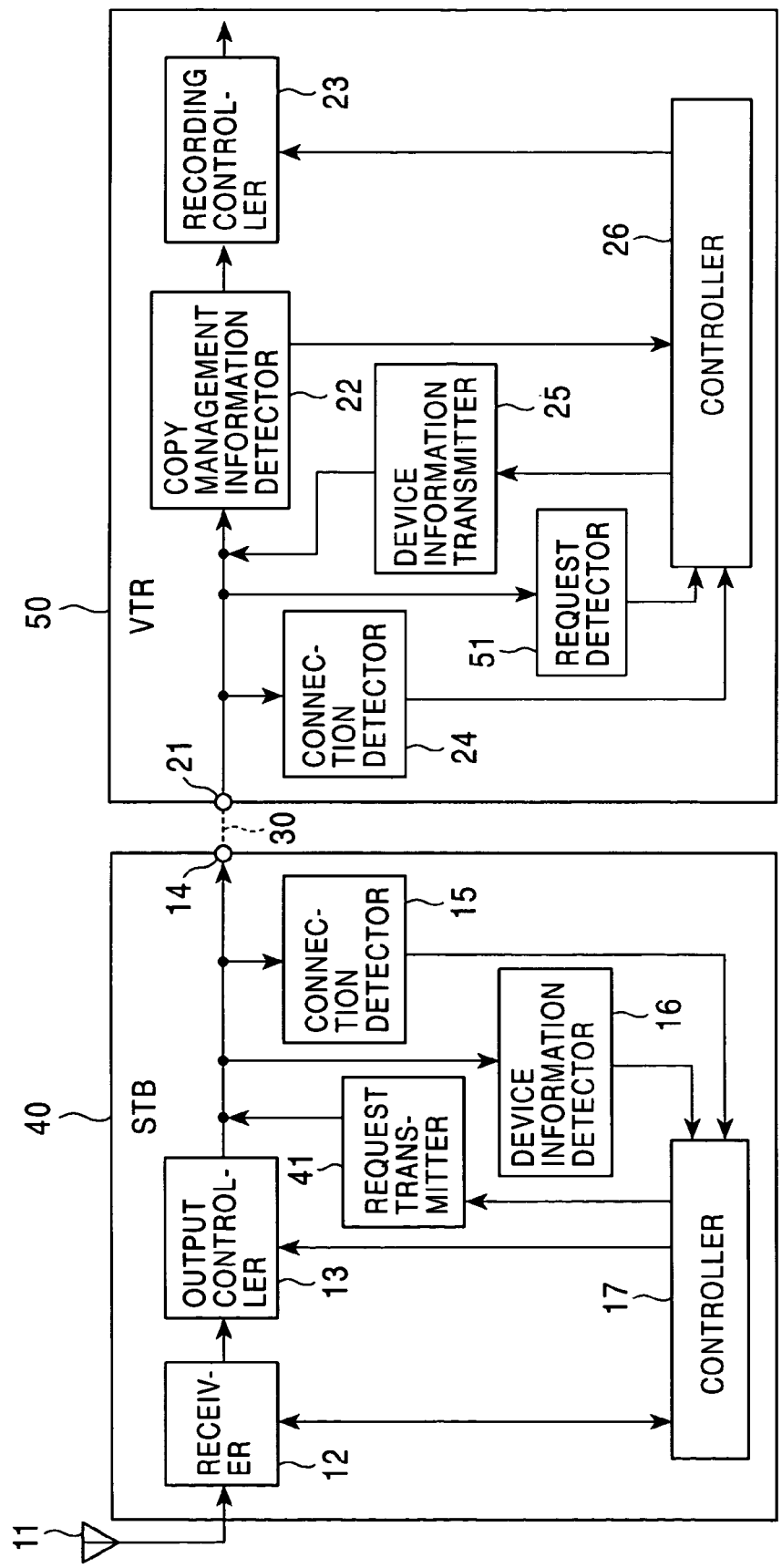
FIG. 9 is a block diagram illustrating another embodiment of an information transmission system according to the present invention.

FIG. 9 is a block diagram illustrating the second embodiment of the information signal transmission system including an STB 40 and a VTR 50. Also in this second embodiment, as shown in FIG. 9, the STB 40 and the VTR 50 are connected to each other via an analog transmission line 30.

As shown in FIG. 9, the STB 40 includes a request transmitter 41 for transmitting a request for transmission of device information over the analog transmission line 30. The other parts of the STB 40 are similar to those of the STB 10 of the first embodiment descried earlier with reference to FIG. 1. In the STB 40 of the second embodiment, similar parts to those of the STB 10 of the first embodiment are denoted by similar reference numerals and they are not described in further detail herein.

On the other hand, as shown in FIG. 9, the VTR 50 includes a request detector 51 for detecting the transmission request transmitted by the STB 40 via the analog transmission line 30. The other parts of the VTR 50 are similar to those of the VTR 20 10 of the first embodiment descried earlier with reference to FIG. 1. In the VTR 50 of the second embodiment, similar parts to those of the VTR 20 of the first embodiment are denoted by similar reference numerals and they are not described in further detail herein.

Also in this second embodiment, when the connection detector 15 of the STB 40 detects that a device has been connected to the output terminal 14 of the STB 40, the connection detector 15 informs the controller 17 that the device has been connected. Upon reception of the notification that the device has been connected to the analog output terminal 14, the controller 17 generates a control signal and transmits it to the request transmitter 41 thereby controlling the request transmitter 41 so as to output a request for transmission of device information.

In response to the control signal received from the controller 41, the request transmitter 41 generates a transmission request in the form of an electric signal having a predetermined fixed pattern for requesting transmission of device information. The generated request signal is output over an analog transmission line via which the output controller 13 and the output terminal 14 are connected to each other. As a result, the request for transmission of device information is supplied to the VTR 50 via the analog output terminal 14, the analog transmission line 30, and the analog input terminal 21 of the VTR 50.

In the VTR 50, the request detector 51 is connected to an analog transmission line via which the analog input terminal 21 and the copy management information detector 22 are connected to each other. The request detector 51 detects the device information transmission request signal having the fixed pattern input via the analog input terminal 21. If the request detector 51 detects the transmission request, the request detector 51 informs the controller 26 that the device information transmission request has been received.

Upon receiving the notification that the transmission request has been received, the controller 26 generates a control signal and transmits it to the device information transmitter 25 thereby controlling the device information transmitter 25 so as to generate and transmit device information. In response to the control signal received from the controller 26, the device information transmitter 25 generates device information indicating that the receiver device is a recording device and supplies the generated device information over the analog transmission line via which the analog input terminal 21 and the copy management information detector 22 are connected to each other.

As a result, the device information in the form of an electric signal output from the device information transmitter 25 of the VTR 50 is transmitted in a reverse direction to the STB 40 via the analog input terminal 21, the analog transmission line 30, and the analog output terminal 14 of the STB 40. In the STB 40, as in the STB 10 of the first embodiment described above, outputting of a video signal to the VTR 50 is controlled in accordance with the device information received from the VTR 50 and also in accordance with copy management information attached to the video signal of a television program of a selected channel.

Operations of STB 40 and VTR 50

Operations of the STB 40 and the VTR 50 connected to each other via the analog transmission line 30 in the information transmission system of the second embodiment are described in further detail below.

Figure 10:
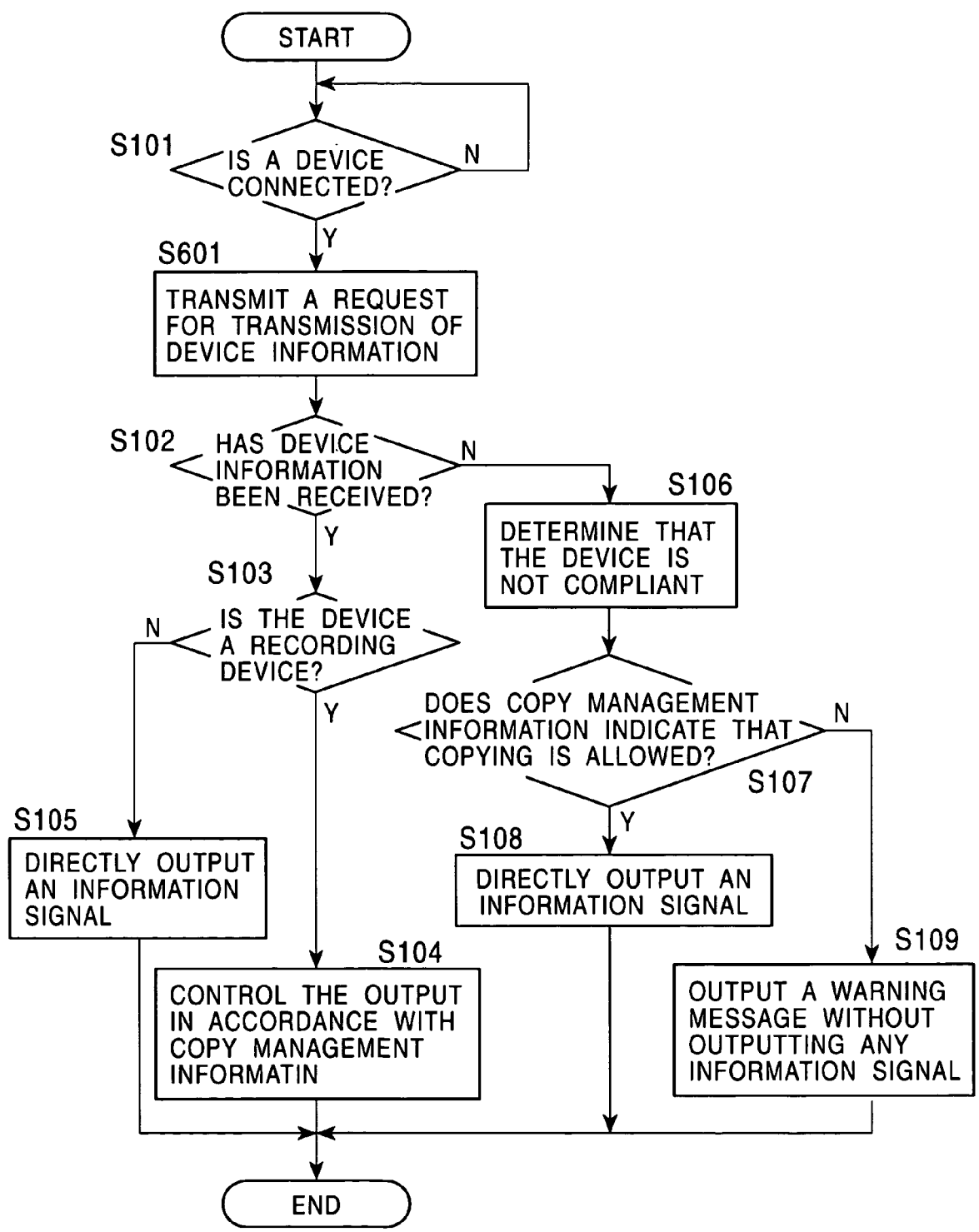
FIG. 10 is a flow chart illustrating a process performed by an STB 40 shown in FIG. 9.

The operation of the STB 40 is described first, with reference to FIG. 10. The STB 40 of the second embodiment operates in a similar manner to the above-described STB 10 of the first embodiment, although there is a slight difference. Therefore, in the flow chart shown in FIG. 10, similar steps to those of the STB 10 of the first embodiment are denoted by similar reference numerals (step numbers) and they are not described in further detail herein.

The process performed by the STB 40 of the second embodiment includes an additional step (S601) for issuing a request for transmission of device information, between step S101 and step S102. That is, when the controller 17 of the STB 40 is notified by the connection detector 15 that a device has been connected to the analog output terminal 14 of the STB 40, the controller 17 controls the request transmitter 41 so as to transmit a transmission request to the device connected to the analog output terminal 14 to request it to return device information.

If the device connected to the output terminal 14 is capable of transmitting device information, the device transmits device information in response to the device information transmission request. Taking into account the content of the received device information, the STB 40 controls outputting of a video signal. That is, step S102 and steps following that are performed in a similar manner as with the STB 10 of the first embodiment described above.

Figure 11:
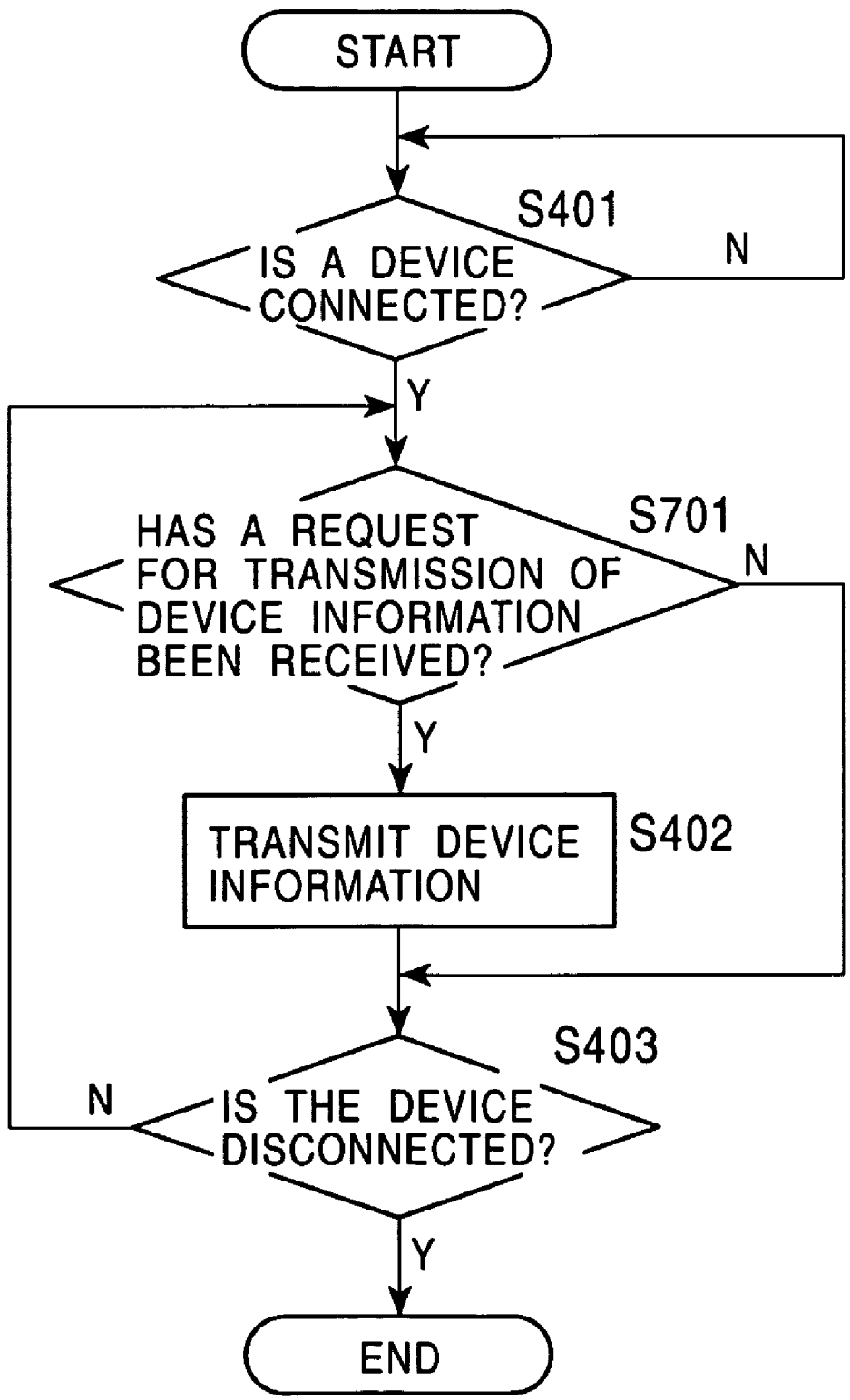
FIG. 11 is a flow chart illustrating a process performed by a VTR 50 shown in FIG. 9.

Now, the operation of the VTR 50 is described. FIG. 11 is a flow chart illustrating the operation of the VTR 50 of the second embodiment. The VTR 50 of the second embodiment operates in a similar manner to the VTR 20 of the first embodiment described above, although there is a slight difference. Therefore, in the flow chart shown in FIG. 11, similar steps to those of the VTR 20 of the first embodiment are denoted by similar reference numerals (step numbers) and they are not described in further detail herein.

The process performed by the VTR 50 of the second embodiment includes an additional step (S701) for determining whether a device information transmission request from the sender device has been detected, between step S401 and step S402. That is, when the power of the VTR 50 is turned on, the connection detector 24 of the VTR 40 starts monitoring whether an electronic device serving as a sender device for outputting a video signal is connected to the analog input terminal 21. If the connection detector 24 detects that a sender device has been connected, the connection detector 24 informs the controller 26 that the sender device has been connected.

Thus, the controller 26 waits in step S401 until connecting of a sender device is detected by the connection detector 24. If it is determined in sep S401 that a sender device has been connected to the analog input terminal 21, the controller 17 determines whether device information has been transmitted from the connected sender device, on the basis of the output signal of the request detector 51 (step S701).

If it is determined in step S701 that a transmission request from the sender device is detected, the controller 26 controls the device information transmitter 25 so as to generate device information indicating that the receiver device is a recording device and supply the generated device information over an analog transmission line via which the analog input terminal 21 and the copy management information detector 22 are connected to each other. Thus, the device information is transmitted in a reverse direction to the STB 40 via the analog input terminal 21, the analog transmission line 30, and the analog output terminal 14 of the STB 40.

Furthermore, the controller 26 determines whether disconnecting of the sender device has been detected by the connection detector 24 (step S403). If it is determined that the sender device is not disconnected, the controller 26 returns the process to step S701 and waits until another transmission request is received. On the other hand, if it is determined in step S403 that disconnecting of the sender device is detected, the controller 26 terminates the process shown in FIG. 11.

In the case where it is determined in step S701 that no transmission request is detected, the controller 26 advances the process to step S403 and to checks the connection of the sender device. If it is determined in step S403 that the sender device is not disconnected, the process returns to step S701, as described above. In the case where it is determined in step S403 that the sender device is disconnected, the controller 26 terminates the process shown in FIG. 11.

As described above, only when a device information transmission request is received from the STB 40, the VTR 50 transmits an electric signal representing device information associate with the VTR 50 over the analog transmission line 30 in a reverse direction thereby sending the device information to the STB 40.

Thus, the VTR 50 does not transmit device information unless a device information transmission request is received. This results in a reduction in the load imposed upon the VTR in transmitting device information. On the other because the STB 40 transmits a request for transmission of device information before outputting a video signal of a television program of a selected channel, the STB 40 can determine the type of a receiver device (VTR 50 in this specific example) on the basis of the device information returned by the VTR 50, before transmitting the video signal.

That is, before outputting a video signal, the STB 40 generates a device information transmission request and transmits it over the analog transmission line as described above. On the basis of device information returned from the receiver device, the STB 40 determines the type of the receiver device. In this technique, the device information does not cause degradation in the video signal, because device information is not transmitted when the video signal is being transmitted via the analog transmission line 30.

Furthermore, the STB 40 is required to detect device information only when it is returned in response to a transmission request. This allows a reduction in the load for the STB 40 to detect device information. Besides, it is ensured that the returned device information can be detected in a highly reliable fashion.

Also in this second embodiment, device information and/or a transmission request may be supplied in the form of a low-level signal over the transmission line.

Third Embodiment

In the first and second embodiments described above, the VTR 20 or 50 sends device information indicating the type thereof (a recording device in this case) to the STB 10 or 40. If information indicating the operation status (operation mode) of the device is transmitted in addition to the information indicating the device type to the sender device which outputs a primary information signal, the system becomes more convenient for users.

For example, when the receiver device to which a primary information signal is to be transmitted is a recording device and when the recording device is in a recording mode, if copy management information attached to the primary information signal indicates that copying is prohibited, the primary information signal is not output thereby protecting the copyright of the primary information signal. If the recording device is not in the recording mode, the information signal may be supplied to the recording device so that the information signal can be monitored by the recording device.

Thus, in a third embodiment of an information signal transmission system, when a sender device for outputting a primary information signal and a receiver device to which the primary information signal is to be output are connected to each other via an analog transmission line, operation status information indicating the operation status of the receiver device in addition to the device type of the receiver device is transmitted to the primary information signal sender device from the receiver device.

Also in this third embodiment, by way of example, the sender device which outputs a primary information signal is an STB (set top box), and the receiver device to which the information signal is output is a VTR (video tape recorder). Furthermore, the information signal transmitted from the STB to the VTR is assumed to be a video signal.

Figure 12:
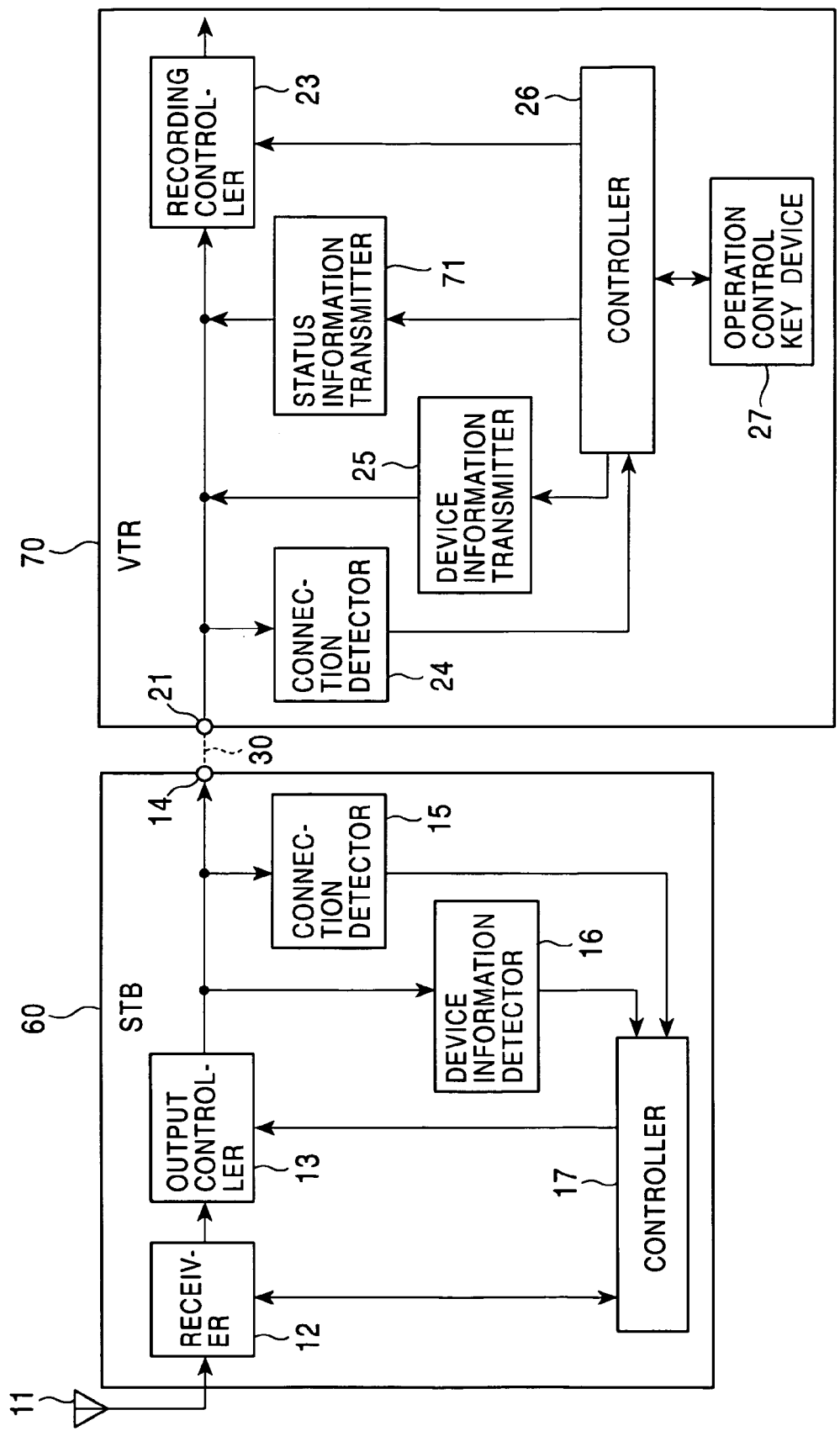
FIG. 12 is a block diagram illustrating still another embodiment of an information transmission system according to the present invention.

FIG. 12 is a block diagram illustrating the third embodiment of the information signal transmission system including an STB 60 and a VTR 70. Also in this third embodiment, as shown in FIG. 12, the STB 60 and the VTR 70 are connected to each other via an analog transmission line 30.

As shown in FIG. 12, the STB 60 is configured in a similar manner to the STB 10 of the first embodiment described earlier, although there is some difference. In the STB 60 of the third embodiment, similar parts to those of the STB 10 of the first embodiment are denoted by similar reference numerals and they are not described in further detail herein. The STB 60 of the third embodiment is different from the STB 10 in that the device information detector 16 of the STB 60 has the capability of detecting not only the device type but also the operation status of a device from device information supplied in the form of an electric signal via the analog transmission line.

As shown in FIG. 12, the VTR 70 of the third embodiment includes a status information transmitter 71. The other parts of the VTR 70 are similar to those of the VTR 20 10 of the first embodiment descried earlier with reference to FIG. 1. In the VTR 70 of the third, similar parts to those of the VTR 20 of the first embodiment are denoted by similar reference numerals and they are not described in further detail herein.

However, in this third embodiment, the VTR 70 does not have the copy management information detector 22, because the operation status such as a recording mode, a playback mode, or a pause mode of the VTR 70 is sent to the STB 60, and the STB 60 controls the outputting of a video signal of a television program of a selected channel taking into account also the operation status of the VTR 70. and the STB 70 controls outputting of a video signal of a television program of a selected channel taking into account the operation status of the VTR 70. However, the VTR 70 may also include the copy management information detector 22 thereby controlling the recording operation in accordance with copy management information attached to a supplied video signal.

In this third embodiment, when the controller 26 of the VTR 70 is notified by the connection detector 24 that a device has been connected to the analog input terminal 21 of the VTR 70, the controller 26 controls the device information transmitter 25 so as to generate device information in the form of an electric signal indicating that the receiver device is a recording device and transmit the generated device information over an analog transmission line via which the analog input terminal 21 and the copy management information detector 22. As a result, the device information output from the device information transmitter 25 is transmitted in a reverse direction to the STB 60 through a path including the analog input terminal 21 of the VTR 70, the analog transmission line 30, and the analog output terminal 14 of the STB 60.

In this VTR 70 of the third embodiment, the controller 26 monitors whether a command is input by a user via an operation control key device 27. If a record command is input, the controller 26 control various parts of the VTR 70 so that the VTR 70 is brought into the recording mode in which a video signal received via the analog input terminal 21 is recorded on a video tape. After that, the controller 26 controls the status information transmitter 71 so as to generate an operation status information indicating the operation status of the VTR 70 and supply it over an analog transmission line via which the analog input terminal 21 and the copy management information detector 22 are connected each other. In this specific case, the operation status information indicating that the VTR 70 has come into the recording mode is transmitted from the VTR 70.

Thus, an electric signal representing the operation status information indicating that the VTR 70 has come into the recording mode is transmitted in a reverse direction from the VTR 70 to the STB 60 through a path including the analog input terminal 21 of the VTR 70, the analog transmission line 30, and the analog output terminal 14 of the STB 60. In this embodiment, as described above, information indicating the device type and operation status information indicating that the VTR 70 has come into the recording mode are transmitted from the VTR 70 to the STB 60.

On the other hand, in the STB 60, outputting of a video signal of a television program of a selected channel is controlled in accordance with the information indicating the device type and the operation status information received from the device connected to the analog output terminal 14. More specifically, as will be described in further detail later, in the case where the receiver device is a recording device being in the recording mode and a video signal to be output has copy management information indicating that copying is prohibited, the controller 17 of the STB 60 controls the output controller 13 so that the video signal is not output.

On the other hand, in the case where the receiver device is a recording device being in the recording mode and a video signal to be output has copy management information indicating that copying is permitted only for a first generation, the controller 17 of the STB 60 controls the output controller 13 such that the copy management information is rewritten so as to indicate no further copying is permitted or copying is prohibited and the video signal is output together with the rewritten copy management information. The rewriting of the copy management information is performed by the output controller 13 of the STB 60. That is, in this third embodiment, output controller 13 also has the capability of rewriting copy management information.

In the case where the receiver device is a recording device which is not in the recording mode, and in the case where the receiver device is a recording device being in the recording mode and a video signal to be output has copy management information indicating that copying is permitted, the controller 17 of the STB 60 controls the output controller 13 so as to directly output a video signal of a television program of a selected channel.

In this third embodiment, as described above, when the receiver device is a recording device, the STB 60 controls the outputting of a video signal taking into account the operation mode of the recording device.

Operations of STB 60 and VTR 70

Operations of the STB 60 and the VTR 70 connected to each other via the analog transmission line 30 in the information transmission system of the third embodiment are described in further detail below.

Figure 13:
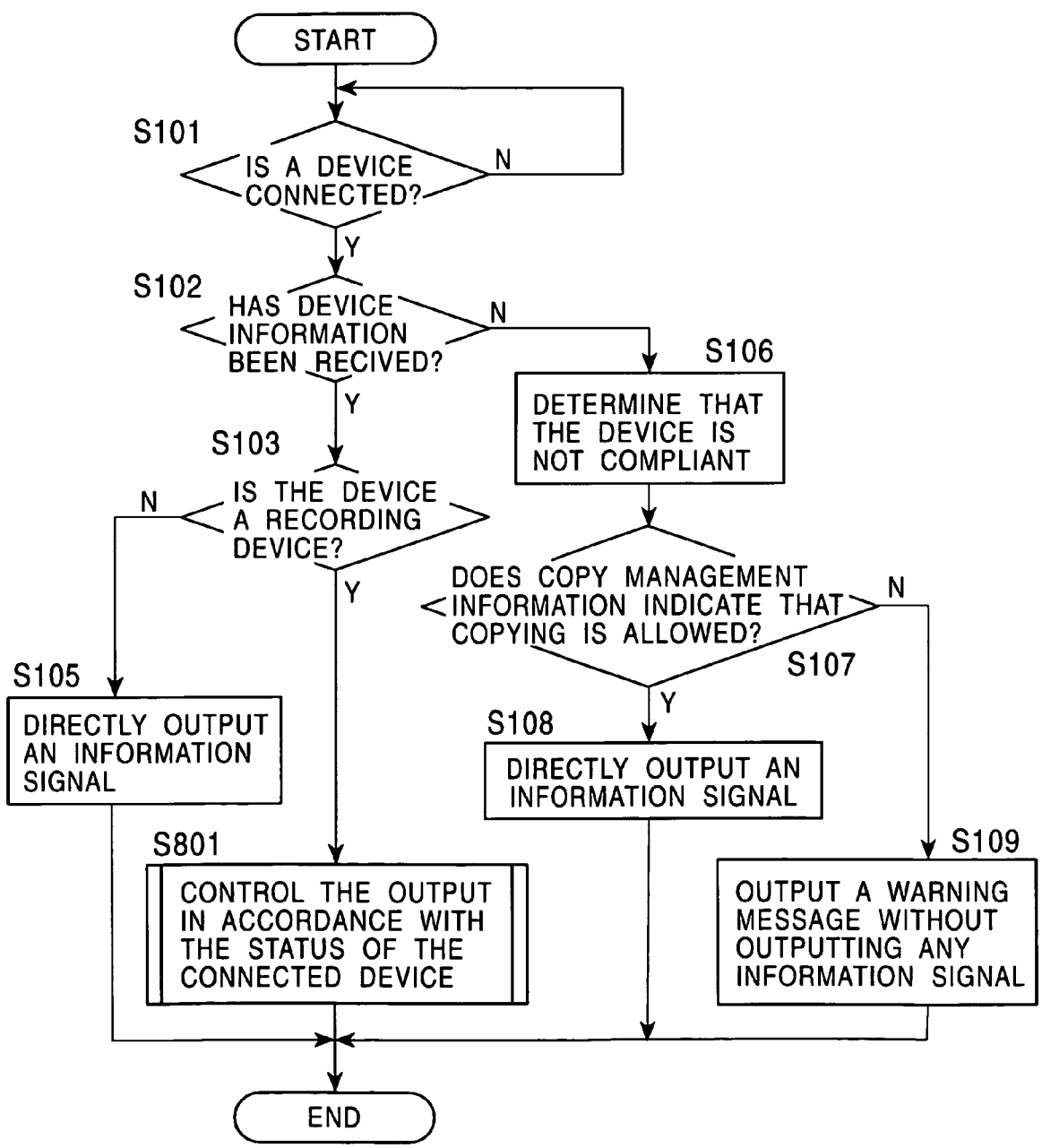
FIG. 13 is a flow chart illustrating a process performed by an STB 40 shown in FIG. 12.

The operation of the STB 60 is described first, with reference to FIG. 13. The STB 60 of the third embodiment operates in a similar manner to the above-described STB 10 of the first embodiment, although there is some difference. Therefore, in the flow chart shown in FIG. 13, similar steps to those of the STB 10 of the first embodiment are denoted by similar reference numerals (step numbers) and they are not described in further detail herein.

In the operation of the STB 60 of the third embodiment, if it is determined in step S101 that a receiver device is connected, the process goes to step S102 to determine whether device information (indicating the type of the receiver device) has been received. If it is determined that device information has been received, the process goes to step S104 to determine whether the device information indicates that the receiver device is a recording device. If it is determined that the receiver device is a recording device, the following step is performed in a different manner from the first embodiment.

That is, step S801 is different from the corresponding step in the first embodiment, although the other steps are similar to those performed by the STB 10 of the first embodiment described earlier with reference to FIG. 2. Step S801, which is performed by the STB 60 of the third embodiment when it is determined in step S103 shown in FIG. 13 that the receiver device is a recording device on the basis of the device information received from the receiver device, is described in detail below with reference to the flow chart shown in FIG. 14.

Figure 14:
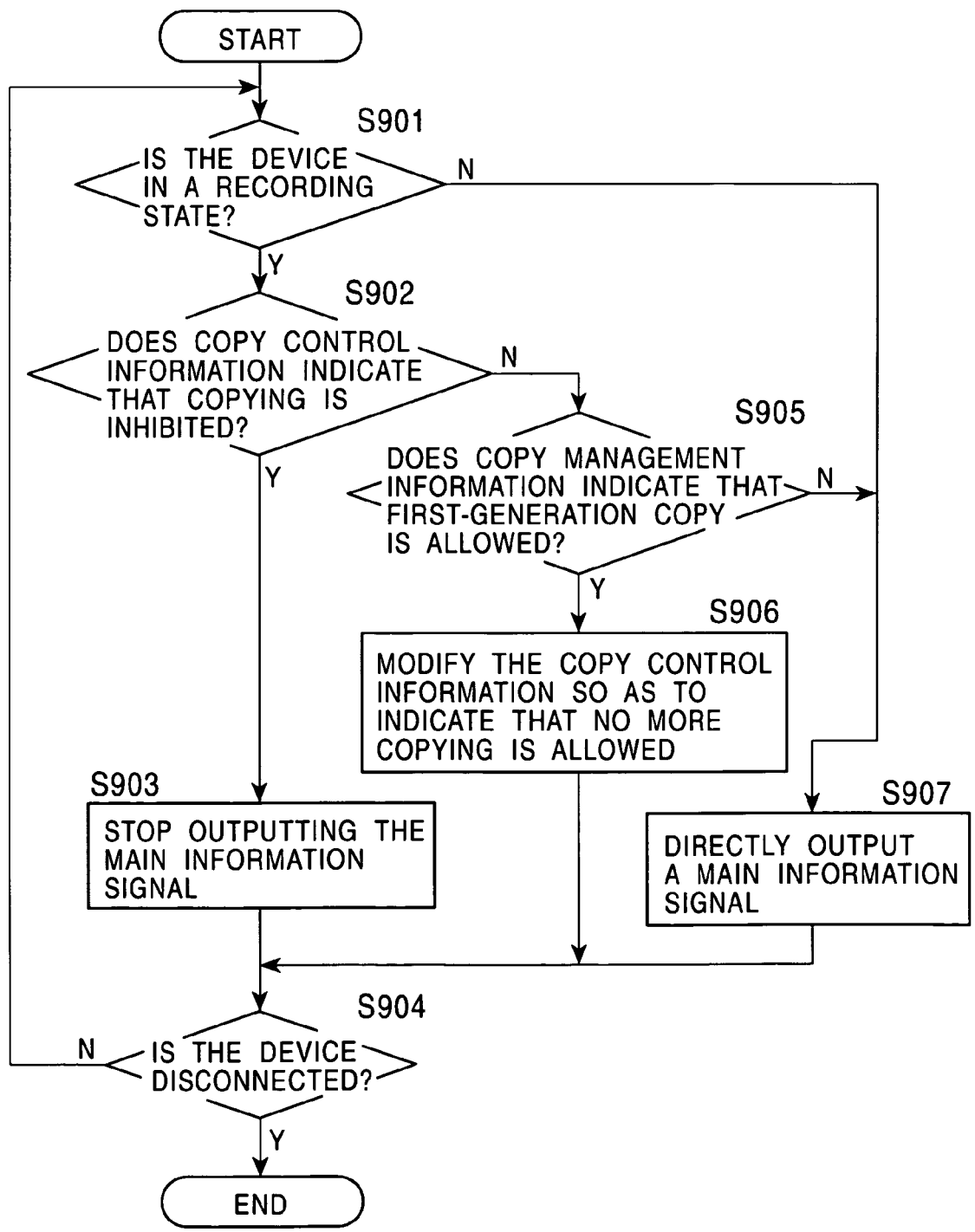
FIG. 14 is a flow chart illustrating the details of step S801 shown in FIG. 13.

FIG. 14 is a flow chart illustrating the details of step S801. If the controller 17 determines in step S103 shown in FIG. 13 that the receiver device is a recording device, the controller 17 performs the process shown in FIG. 14. That is, the controller 17 determines whether the operation status information detected by the device information detector 16 of the STB 60 indicates that the receiver device is in the recording mode (step S901).

If it is determined in step S901 that the operation status information received from the receiver device (VTR 70) indicates that the receiver device is in the recording mode, the controller 17 further determines whether copy management information detected from a video signal of a television program of a selected channel received by the receiving unit 12 indicates that copying is prohibited (step S902).

More specifically, if the copy management information detected from the video signal indicates that copying is unconditionally prohibited or further copying is prohibited, it is determined in step S902 that copying is prohibited. In the case where it is determined in step S902 that copy management information indicates that copying is prohibited, the controller 17 controls the output controller 13 such that the video signal of the television program of the selected channel is not output (step S903).

After that, the controller 17 determines whether disconnecting of the receiver device is disconnected, on the basis of the detection result output by the connection detector 15 (step S904). If it is determined in step S904 that the connection with the receiver device is maintained, the process returns to step S901 to check whether the operation status of the receiver device (VTR 70) is maintained or changed.

In the case where it is determined in step S902 that the copy management information indicates that copying is not prohibited, the controller 17 further determines whether the copy management information detected from the video signal received by the receiving unit 12 indicates that copying is permitted for a first generation (step S905).

If it is determined in step S905 that the copy management information indicates that copying is permitted for a first generation, the controller 17 controls the output controller 13 such that the copy management information is rewritten so as to indicate no further copying is permitted or copying is prohibited, and the video signal is output together with the rewritten copy management information (step S906).

In the case where it is determined in step S905 that permission for making a first-generation copy is not indicated by the copy management information, or in the case where it is determined in step S901 that the operation status information received from the receiver device indicates that the receiver device in not in the recording mode, the controller 17 controls the output controller 13 such that the video signal of the television program of the selected channel is directly output (step S907).

That is, when it is determined in step S901 that the receiver device is not in the recording mode, the video signal will not be recorded by the receiver device, and thus the video signal is directly output in step S907. If the copy management information indicates neither of "prohibition against making a copy" (unconditional prohibition), "prohibition against making a further copy", and "permission to make a first-generation copy", then the copy management information must indicate that copying is permitted or otherwise no copy management information is attached to the video signal and thus copying is substantially permitted. In this case, no problem occurs if the video signal is copied, and thus the video signal is directly output in step S907.

After step S906 or step S907, the process goes to step S904 to determine whether the receiver device is disconnected. If it is determined in step S904 that the connection with the receiver device is maintained, the process returns to step S901. On the other hand, if it is determined that the receiver device has been disconnected, the process shown in FIG. 14 is terminated.

Figure 15:
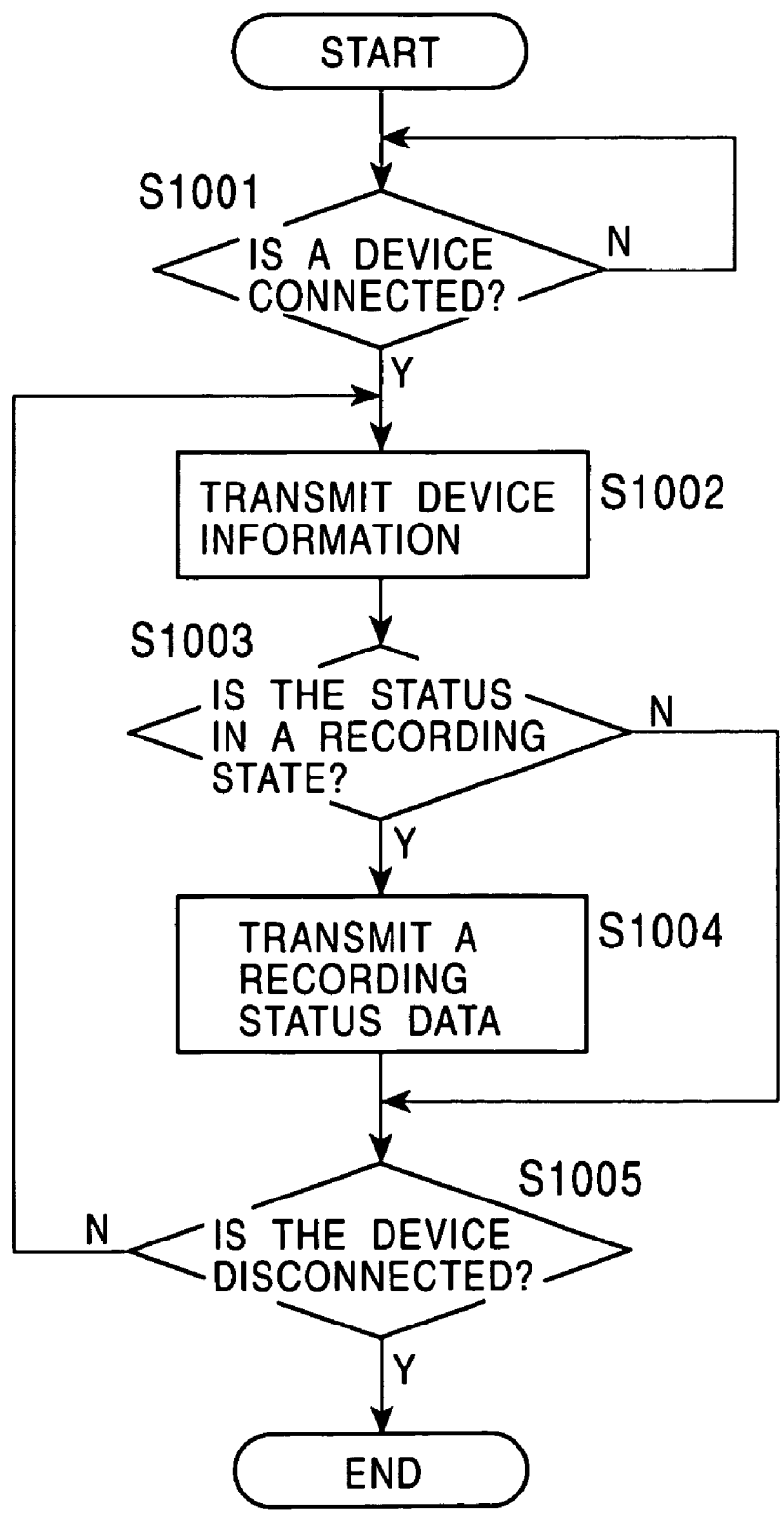
FIG. 15 is a flow chart illustrating a process performed by a VTR 50 shown in FIG. 12.

Now, the operation of the VTR 70 is described. FIG. 15 is a flow chart illustrating the operation of the VTR 70 of the third embodiment. If the power of the VTR 70 is turned on, the controller 26 of the VTR 70 starts the process shown in FIG. 15.

First, the controller 26 determines whether a sender device is connected to the analog input terminal of the VTR 70, on the basis of the output of the connection detector 24 (step S1001), If it is determined in step S1001 that a sender device is connected to the output terminal, the controller 26 controls the device information transmitter 25 to transmit device information indicating that the receiver device is a recording device over the analog transmission line disposed between the analog input terminal 21 and the copy controller 23 (step S1002). As a result, the device information is transmitted in a reverse direction to the STB 60 via the analog input terminal 21, the analog transmission line 30, and the analog output terminal 14 of the STB 60.

After that, the controller 26 determines whether, in response to a record command issued by a user via the operation control key device 27, the VTR 70 has brought into the recording mode in which a video signal supplied via the analog input terminal 21 is to be recorded on a video tape (step S1003).

If it is determined in step S1003 that the VTR 70 has brought into the recording mode, the controller 26 controls the status information transmitter 71 so as to transmit operation status information indicating that the VTR 70 is in the recording mode, over the analog transmission line extending between the analog input terminal 21 and the recording controller 23 (step S1004). As a result, the operation status information is transmitted in a reverse direction to the STB 60 via the analog input terminal 21, the analog transmission line 30, and the analog output terminal 14 of the STB 60 thereby informing the STB 60 that the VTR 70 has brought into the recording mode.

When the transmission of the operation status information in step S1004 is completed, or when it is determined in step S1003 that the VTR 70 is not in the recording mode, the controller 26 then determines whether the sender device is disconnected, on the basis of the detection output of the connection detector 24 (step S1005).

In this third embodiment, if it is determined in step S1005 that the connection with the sender device is maintained, the process is repeated from step S1002. On the other hand, if it is determined in step S1005 that the sender device has been disconnected, the controller 26 terminates the process shown in FIG. 15.

In the information transmission system of the third embodiment, as described above, when the receiver device to which a primary information signal is to be output is a recording device, information indicating the operation status of the recording device is supplied to the sender device which outputs the information signal, thereby allowing the sender device to control the outputting of the information signal taking into account the operation status of the receiver device, that is, the recording device. This allows a user to use the information transmission system in a more convenient manner.

Also in this third embodiment, the device information and/or the operation status information may be supplied in the form of a low-level signal over the transmission line so that the device information or the operation status information does not affect the information signal. Furthermore, as in the second embodiment, the device information or the operation status information may be supplied over the transmission line when a transmission request is received from the STB 60.

Fourth Embodiment

In the first to third embodiments described above, an STB serving as a sender device for outputting an image signal and a VTR serving as a receiver device to which the information signal is output are connected to each other via an analog transmission line, and an analog video signal is transmitted from the STB to the VTR. The present invention may also be applied to a system in which a digital signal is transmitted via a digital serial transmission line.

With reference to FIGS. 16 and 17, a fourth embodiment is described below in which a primary information signal such as a video signal is transmitted between electronic devices via a digital serial transmission line. Herein, it is assumed that a digital video signal is transmitted serially between an STB 10 and a VTR 20 having similar configurations to those shown in FIG. 1 and connected to each other via a digital serial transmission line. Thus, FIG. 1 is also referred to in the following description.

Although in this embodiment a video data in the form of a digital serial data is handled, the STB 10 and the VTR 20 have no great difference in configuration from those which handle analog data. Herein let us assume that a digital video signal Me shown in FIG. 16A is transmitted from the STB 10 to the VTR 20 via the digital serial transmission line, and digital device information Ks shown in FIG. 16B is transmitted in a reverse direction via the digital serial transmission line from the VTR 20 to the STB 10.

The device information transmitter 25 converts the digital device information Ks (FIG. 16B) to digital device information Kn, as shown in FIG. 16C, so as to have a level low enough not to affect the detection of binary levels of the digital video signal Me. More specifically, the amplitude of the digital device information is reduced to a level much lower than a threshold th used to determine the binary levels of the digital video signal, and the resultant digital device information Kn having the extremely low level is supplied over the digital serial transmission line.

If the digital device information Kn is transmitted when the digital video signal is being transmitted via the digital serial transmission line, the digital device information Kn is added to (superimposed upon) the digital video signal Me as show in FIG. 16D. However, the digital device information Kn does not affect the determination of the binary levels of the digital video signal Me.

The device information detector 16 of the STB 10 performs a thresholding process using a threshold value th upon the digital video signal Me including the low-level device information (FIG. 17A) superimposed by the VTR 20 upon the digital video signal Me, thereby reproducing the original digital video signal Me (FIG. 17B).

The original digital video signal Me (FIG. 17B) obtained by the above-described thresholding process is subtracted from the digital video signal contaminated with the low-level device information (FIG. 17A) thereby extracting the low-level device information Kn (FIG. 17C). The extracted low-level device information Kn is then converted to a signal having a level equal to the original level, as shown in FIG. 17D. Thus, the STB 10 obtains the device information which has been transmitted in a reverse direction from the VTR toward the STB 10 via the digital serial transmission line.

As in the first embodiment described above, the VTR 20 transmits the device information only when connecting of a sender device is detected. On the other hand, when the primary information signal sender device detects that a receiver device is brought into connection with the sender device, the sender device does not output a primary information signal such as a video signal for a predetermined period of time and waits for reception of device information. After receiving the device information, the sender device starts to output the primary information signal. This prevents the primary information signal such as a video signal from being degraded by the device information transmitted in the reverse direction via the digital serial transmission line.

Alternatively, the primary information signal receiver device may transmit device information when a transmission request is received from the primary information signal sender device. Furthermore, in addition to device information, operation status information indicating the operation status of the receiver device may also be transmitted in the reverse direction via the digital serial transmission line.

Also in this fourth embodiment in which digital data is serially transmitted, as described above, information such as device information and operation status information can be transmitted in the reverse direction from an electronic device employed as a receiver device to an electronic device employed as a sender device via a transmission line (digital serial transmission line) connecting the sender and receiver devices to each other, as in the first to third embodiments in which an analog information signal is transmitted.

Although in the embodiments described above, a video signal is transmitted between electronic devices, the present invention is not limited to the video signal. The present invention may also be employed when both a video signal and an audio signal are transmitted, or when only a audio signal is transmitted. Furthermore, the present invention may also be employed when a computer program or computer data is transmitted.

Although in the embodiments described above, an STB (set top box) is used as the sender device for outputting a primary information signal, and a VTR (video tape recorder) is used as the receiver device to which the primary information signal is output, the types of sender and receiver devices are not limited to those.

Various types of devices which reproduce and output an information signal such as a video signal or an audio signal may be employed as the sender device. For example, the sender device which outputs an information signal may be a device for reproducing or recording/reproducing a DVD (digital video disk) a device for reproducing an LD (laser disk), a video tape recorder, a device for reproducing a CD, a device for reproducing an MD, a device for recording/reproducing an MD, or a cassette tape recorder.

On the other hand, various types of recording devices using a magnetic recording medium such as a video tape, a hard disk, or a floppy disk, a magnetooptical recording medium such as an MD (mini disc), or an optical recording medium such as DVD may be employed as the receiver device. Other types of electronic devices such as a repeater which processes received information and outputs the resultant information may also be employed as the receiver device.

The present invention may also be employed when data is transmitted between computers such as personal computers or between a computer and an electronic device of another type.

In the embodiments described above, the device information transmitter 25 for outputting information indicating the type of the device and the status information transmitter 17 for outputting information indicating the operation status of the device are separately formed in the second electronic device. Alternatively, a single device information transmitter may be used to output both information indicating the device type and information indicating the operation status of the device under the control of the controller 26.

On the other hand, in the first electronic device, the single device information detector 16 is used to detect both information indicating the device type and information indicating the operation status of the device. Alternatively, a detector for detecting information indicating the device type and a detector for detecting information indicating the operation status may be formed separately.

Furthermore, in the embodiments described above, information indicating the device type or information indicating the operation status is sent as device information to the sender device which outputs a primary information signal. However, the device information is not limited to such information. For example, a manufacturer code or version information or other information associated with a receiver device to which an information signal is output may be transmitted as required.

In the embodiments described above, connecting of a sender or receiver device (electronic device) is detected on the basis of the impedance or the voltage level of the signal at the output terminal 14 or the input terminal 21. Alternatively, connecting of a transmission line to the output terminal 14 or the input terminal 21 may be mechanically detected, and it may be determined that a device is connected when connecting of the transmission line to the output terminal 14 or the input terminal is detected.

In the embodiments descried above, CGMS information attached to a video signal is employed as the copy management information. However, the invention is not limited to such information. For example, when the information signal is an audio signal, SCMS information may be employed as the copy management information. Electronic watermark information superimposed upon an information signal may also be used as the copy management information. That is, various types copy management information attached to an information signal may be employed.

In the embodiments described above, device information associated with a VTR is supplied to an STB via an analog transmission line or a digital serial transmission line whereby the STB controls outputting of a video signal taking into account the device information. However, the control of information signals is not limited to a manner in which the information signal is simply output or not output.

For example, when a television set is employed as the second electronic device, an STB employed as the first electronic device may supply a video signal including information about controlling operations performed upon the first electronic device, such as a selected channel and a sound volume level so that they may be displayed on the television set.

However, when a recording device such as a VTR is employed as the second electronic device, the outputting of the video signal is controlled such that information about the selected channel or the sound volume level is not included in the video signal output from the first electronic device. As described above, the information signal output from the first electronic device may be processed depending upon the type of the first electronic device.

In some cases, a plurality of analog transmission lines are used in an information transmission system. For example, it is known in the art to use two transmission lines to transmit left (L) and right (R) channels of audio signals, respectively. It is also known to use three transmission lines to transmit three primary color component signals (R, G, B) of a video signal.

When a plurality of transmission lines are used, device information may be transmitted in a reverse direction using one of the plurality of transmission lines.

A plurality of transmission lines may be connected to an electronic device using a single connector in which a plurality of terminals are integrated. Also in this case, device information may be transmitted in a reverse direction using one of transmission lines.

When the device information transmitter of the second electronic device is transmitting device information, a primary information signal such as a video signal received from the first electronic device may be controlled such that it is not recorded or output thereby preventing use of the primary information signal contaminated with the device information.

As can be understood from the above description, the present invention provides great advantages. That is, the invention allows information such as device information to be transmitted from an electronic device employed as a primary information signal sender to an electronic device employed as a primary information signal receiver via an existing analog transmission line or digital serial transmission line without having to provide an additional transmission line. The electronic device employed as the primary information signal sender can control outputting of the primary information signal or can process the primary information signal, taking into account the information received from the electronic device employed as the primary information signal receiver.

What is claimed is:

1. An information signal transmission apparatus of transmitting a primary information signal from a first electronic device to a second electronic device acting as a sender in a system via a transmission line connected between an analog output terminal of said first electronic device acting as a receiver in the system and an analog input terminal of said second electronic device, said apparatus being characterized in that:

said second electronic device supplies, in the form of an electronic signal, device information associated with said second electronic device over said information signal transmission line; and said first electronic device does not output said primary information signal, when said device information received via said transmission line indicates that said second electronic device is in a recording mode and when copy management information attached to said primary information signal indicates that copying is prohibited, wherein when said device information indicates a transition into a recording mode and when said copy management information attached to said primary information signal indicates copying is permitted only for a first generation copy, said first electronic device rewrites said copy management information so as to indicate copying is prohibited and outputs said primary information signal together with said rewritten copy management information attached thereto.

2. The information signal transmission apparatus according to claim 1, wherein when said second electronic device detects that an electronic device is brought into connection with said second electronic device via said analog input terminal, said second electronic device supplies said device information over said transmission line.

3. The information signal transmission apparatus according to claim 1, wherein when said first electronic device detects that an electronic device is brought into connection with said first electronic device via said analog output terminal, said first electronic device detects said device information supplied via said transmission line.

4. The information signal transmission apparatus according to claim 1, wherein said first electronic device controls outputting of said primary information signal so that said primary information signal is output after detecting said device information supplied via said transmission line.

5. The information signal transmission apparatus according to claim 1, wherein said second electronic device always supplies said device information over said transmission line.

6. The information signal transmission apparatus according to claim 1, wherein said second electronic device supplies said device information over said transmission line at intermittent time intervals.

7. The information signal transmission apparatus according to claim 1, wherein:

said first electronic device transmits via said transmission line a request for transmission of said device information; and in response to said transmission request received via said transmission line, said second electronic device supplies said device information over said transmission line.

8. The information signal transmission apparatus according to claim 1, wherein said second electronic device supplies said device information over said transmission line such that said device information has a lower signal level than a signal level of said primary information signal.

9. The information signal transmission apparatus according to claim 8, wherein said second electronic device converts said device information into a signal having a low signal level by means of a spread spectrum conversion.

10. The information signal transmission apparatus according to claim 1, wherein when said second electronic device is supplying said device information over said transmission line, said second electronic device does not process said primary information signal received via said transmission line.

11. The information signal transmission apparatus according to claim 1, wherein when said device information received via said transmission line indicates said second electronic device is in the recording mode and when said copy management information attached to said primary information signal indicates only a first-generation copy is permitted, said first electronic device rewrites said copy management information to indicate copying is prohibited and outputs said primary information signal with said rewritten copy management information attached thereto.

12. The information signal transmission apparatus according to claim 1, wherein:

a digital serial output terminal is used in place of said analog output terminal and a digital serial input terminal is used in place of said analog input terminal; and said first electronic device detects said device information supplied in the form of the electronic signal over said transmission line and controls the output of said primary digital data in accordance with the detected device information.

13. An information signal transmission system for transmitting a primary information signal from a first electronic device acting as a sender in the system to a second electronic device acting as a receiver in the system via a transmission line connected between an analog output terminal of said first electronic device and an analog input terminal of said second electronic device, said system being characterized in that:

said second electronic device includes device information transmitting means for supplying, in the form of an electronic signal, device information associated with said second electronic device over said information signal transmission line; and said first electronic device does not output said primary information signal, when said device information received via said transmission line indicates that said second electronic device is in a recording mode and when copy management information attached to said primary information signal indicates that copying is prohibited, wherein when said device information indicates a transition into a recording mode and when said copy management information attached to said primary information signal indicates copying is permitted only for a first generation copy, said first electronic device rewrites said copy management information so as to indicate copying is prohibited and outputs said primary information signal together with said rewritten copy management information attached thereto.

14. The information signal transmission system according to claim 13, wherein:

said second electronic device includes connection detecting means for detecting whether an electronic device is brought into connection with said analog input terminal; and when said connection detecting means detects an electronic device has been brought into connection with said analog input terminal, said device information transmitting means of said second electronic device supplies said device information over said transmission line.

15. The information signal transmission system according to claim 13, wherein:

said first electronic device includes connection detecting means for detecting whether an electronic device is brought into connection with said analog output terminal; and when said connection detecting means detects an electronic device has been brought into connection with said analog output terminal, said device information detecting means of said first electronic device detects said device information.

16. The information signal transmission system according to claim 13, wherein outputting of said primary information signal is controlled so that said primary information signal is output after detecting said device information supplied via said transmission line.

17. The information signal transmission system according to claim 13, wherein said device information transmitting means of said second electronic device always supplies said device information over said transmission line.

18. The information signal transmission system according to claim 13, wherein said device information transmitting means of said second electronic device supplies said device information over said transmission line at intermittent time intervals.

19. The information signal transmission system according to claim 13, wherein said first electronic device includes:

request transmitting means for supplying over said transmission line a request for transmission of said device information; and request detecting means for detecting said transmission request transmitted via said transmission line, whereby when said request detecting means detects said transmission request, said device information transmitting means of said second electronic device supplies said device information over said transmission line.

20. The information signal transmission system according to claim 13, wherein said device information transmitting means of said second electronic device supplies said device information over said transmission line such that said device information has a lower signal level than a signal level of said primary information signal.

21. The information signal transmission system according to claim 20, wherein said device information transmitting means of said second electronic device converts said device information into a signal having a low signal level by means for performing a spread spectrum conversion.

22. The information signal transmission system according to claim 13, wherein:

said second electronic device includes information signal processing means for processing said primary information signal supplied via said transmission line, whereby when said device information transmitting means of said second electronic device supplies said device information over said transmission line, said information signal processing means does not process said primary information signal supplied via said transmission line.

23. The information signal transmission system according to claim 13, wherein a digital serial output terminal is used in place of said analog output terminal and a digital serial input terminal is used in place of said analog input terminal.

* * * * *